(12) United States Patent
Monforte Duart

(10) Patent No.: US 12,390,039 B2
(45) Date of Patent: Aug. 19, 2025

(54) FILTERING BEAKER, KIT AND DEVICE FOR PRODUCING A LIQUID EMULSION

(71) Applicant: Andoni Monforte Duart, Alboraya (ES)

(72) Inventor: Andoni Monforte Duart, Alboraya (ES)

( * ) Notice: Subject to any disclaimer, the term of this patent is extended or adjusted under 35 U.S.C. 154(b) by 0 days.

(21) Appl. No.: 18/716,236

(22) PCT Filed: Dec. 12, 2022

(86) PCT No.: PCT/EP2022/085316
§ 371 (c)(1),
(2) Date: Jun. 4, 2024

(87) PCT Pub. No.: WO2023/105081
PCT Pub. Date: Jun. 15, 2023

(65) Prior Publication Data
US 2024/0415310 A1    Dec. 19, 2024

(30) Foreign Application Priority Data
Dec. 10, 2021    (EP) .................................... 21383130

(51) Int. Cl.
*A47J 19/00*    (2006.01)
*A47J 19/02*    (2006.01)

(52) U.S. Cl.
CPC ............. *A47J 19/005* (2013.01); *A47J 19/02* (2013.01)

(58) Field of Classification Search
CPC ................................ A47J 19/005; A47J 19/02
USPC ........................................................ 99/646 R
See application file for complete search history.

(56) References Cited

U.S. PATENT DOCUMENTS

| 881,562 A | * | 3/1908 | Ellie | ........................ A47J 31/20 |
| | | | | 99/319 |
| 1,036,767 A | * | 8/1912 | Wojidkow | ............ A47J 31/053 |
| | | | | 99/312 |
| 2,900,896 A | * | 8/1959 | Bondanini | ............. A47G 19/14 |
| | | | | 99/287 |

(Continued)

FOREIGN PATENT DOCUMENTS

| CN | 202016675 U | 10/2011 |
| CN | 103813741 A | 5/2014 |

(Continued)

OTHER PUBLICATIONS

International Search Report & Written Opinion of the International Searching Authority dated Apr. 26, 2023 for International Application No. PCT/EP2022/085316.

(Continued)

*Primary Examiner* — Jimmy Chou
(74) *Attorney, Agent, or Firm* — Eschweiler & Potashnik, LLC

(57) ABSTRACT

The invention refers to filtering beaker for producing a liquid emulsion comprising a tubular main body and a filtering body removably attachable to the main body. The filtering body is or comprises a base covering a cross-section of the filtering beaker. The filtering beaker comprises at least one filtering area for filtering and emulsifying a liquid emulsion being produced with the filtering beaker. The invention further refers to a related filtering kit and to a related device for producing a liquid emulsion.

20 Claims, 10 Drawing Sheets

(56) References Cited

U.S. PATENT DOCUMENTS

| | | | | |
|---|---|---|---|---|
| 3,336,857 | A * | 8/1967 | Knodt | A47J 31/16 99/295 |
| 3,757,670 | A * | 9/1973 | Laama | A47J 31/306 99/302 R |
| 3,858,493 | A * | 1/1975 | Hermsen | A47J 31/0631 210/405 |
| 5,008,013 | A * | 4/1991 | Favre | B65D 85/8061 99/295 |
| 5,865,096 | A * | 2/1999 | Kawabata | A47J 31/36 99/302 R |
| 6,561,080 | B1 * | 5/2003 | Feeney | A47J 31/24 99/295 |
| 6,606,938 | B2 * | 8/2003 | Taylor | A47J 31/32 426/77 |
| 7,318,374 | B2 * | 1/2008 | Guerrero | A47J 31/0626 99/321 |
| 7,997,448 | B1 * | 8/2011 | Leyva | B67D 1/1247 222/1 |
| 8,215,228 | B2 * | 7/2012 | Skalski | B65D 85/8049 99/290 |
| 8,227,000 | B2 * | 7/2012 | Skalski | B65D 85/8049 426/77 |
| 8,230,777 | B2 * | 7/2012 | Anson | B65D 47/243 220/501 |
| 8,297,180 | B2 * | 10/2012 | Skalski | A47J 31/0668 99/279 |
| 9,352,950 | B2 * | 5/2016 | Berger | B67D 1/0895 |
| 9,591,942 | B2 * | 3/2017 | Chiu | A47J 31/005 |
| 9,648,976 | B2 * | 5/2017 | Scott | A47J 31/02 |
| 10,126,215 | B2 * | 11/2018 | Stern | B30B 9/26 |
| 10,533,790 | B2 * | 1/2020 | Sakthivel | F25D 23/126 |
| 10,674,860 | B2 * | 6/2020 | Miller | F25D 23/126 |
| 10,674,862 | B1 * | 6/2020 | Johnson | A47J 31/446 |
| 10,786,109 | B2 * | 9/2020 | Sakthivel | F25D 23/04 |
| 10,912,409 | B2 * | 2/2021 | Wantland | F25C 5/22 |
| 11,412,881 | B2 * | 8/2022 | Giordano | A47J 31/06 |
| 11,707,153 | B2 * | 7/2023 | Ewing | B30B 9/06 99/287 |
| 11,825,981 | B2 * | 11/2023 | Abeygunawardana | A47J 31/4407 |
| 12,128,334 | B2 * | 10/2024 | Chin | B01D 33/0183 |
| 12,156,605 | B1 * | 12/2024 | Crane | B01D 25/12 |
| 2007/0256569 | A1 * | 11/2007 | Lee | A47J 31/18 99/275 |
| 2009/0241782 | A1 * | 10/2009 | Van Dillen | A47J 31/44 137/15.01 |
| 2009/0293530 | A1 * | 12/2009 | Van Dillen | B67D 1/0861 222/146.1 |
| 2010/0154649 | A1 * | 6/2010 | Skalski | A47J 31/0668 222/173 |
| 2012/0121779 | A1 * | 5/2012 | Lai | A47J 31/42 426/433 |
| 2012/0186293 | A1 * | 7/2012 | Skalski | A47J 31/0668 99/300 |
| 2012/0225175 | A1 * | 9/2012 | Lown | A23F 3/18 426/435 |
| 2013/0105340 | A1 * | 5/2013 | Hother | A47J 31/3676 206/222 |
| 2013/0112576 | A1 * | 5/2013 | Hother | C12P 7/08 206/222 |
| 2014/0013958 | A1 * | 1/2014 | Krasne | A47J 31/057 99/284 |
| 2014/0120223 | A1 * | 5/2014 | Boubeddi | A47J 31/407 99/295 |
| 2014/0147560 | A1 * | 5/2014 | Radhakrishnan | A47J 31/3614 99/283 |
| 2014/0205725 | A1 * | 7/2014 | Albanese | A47J 31/20 426/433 |
| 2014/0251152 | A1 * | 9/2014 | Tien | A47J 31/446 99/322 |
| 2014/0299000 | A1 * | 10/2014 | Hanneson | A47J 31/3695 99/323 |
| 2014/0356501 | A1 * | 12/2014 | Juris | A23F 5/265 426/433 |
| 2014/0360379 | A1 * | 12/2014 | Radhakrishnan | A47J 31/3633 99/323 |
| 2015/0028140 | A1 * | 1/2015 | Monforte Duart | A47J 19/04 241/69 |
| 2015/0107460 | A1 * | 4/2015 | Wilson | F25D 3/11 99/295 |
| 2015/0164261 | A1 * | 6/2015 | Fukumura | A47J 31/18 99/323 |
| 2015/0196158 | A1 * | 7/2015 | Velasquez | A47J 31/38 99/297 |
| 2015/0208853 | A1 * | 7/2015 | Melzer | A47J 19/005 99/287 |
| 2015/0230651 | A1 * | 8/2015 | Molayem | A47J 41/0044 99/322 |
| 2016/0058242 | A1 * | 3/2016 | Viet-Doan | A47J 31/462 99/283 |
| 2016/0145038 | A1 * | 5/2016 | Apone | A47J 42/46 53/445 |
| 2016/0157665 | A1 * | 6/2016 | Doglioni Majer | A47J 31/3614 426/433 |
| 2016/0157668 | A1 * | 6/2016 | Bugnano | A47J 31/4492 426/232 |
| 2017/0059455 | A1 | 3/2017 | Stern et al. | |
| 2017/0245675 | A1 * | 8/2017 | Junge | B65D 85/8043 |
| 2018/0008087 | A1 * | 1/2018 | Miller | A47J 31/407 |
| 2018/0084938 | A1 * | 3/2018 | Sakthivel | F25D 23/126 |
| 2018/0299190 | A1 * | 10/2018 | Sakthivel | B67D 1/0888 |
| 2020/0029725 | A1 * | 1/2020 | Wantland | A47J 31/407 |
| 2020/0323378 | A1 | 10/2020 | Patel | |
| 2022/0071437 | A1 * | 3/2022 | Tseng | A47J 31/4492 |

FOREIGN PATENT DOCUMENTS

| | | | |
|---|---|---|---|
| CN | 206285555 U | 6/2017 | |
| CN | 208228832 U | 12/2018 | |
| CN | 208525952 U | 2/2019 | |
| CN | 209058650 U | 7/2019 | |
| CN | 210961413 U | 7/2020 | |
| KR | 20210060149 A | 5/2021 | |
| WO | 2013120813 A1 | 8/2013 | |
| WO | 2014042436 A1 | 3/2014 | |
| WO | WO-2020125137 A1 * | 6/2020 | A47J 31/005 |

OTHER PUBLICATIONS

European Search Report dated Jun. 15, 2022 for European Application No. 21383130.8.
Intension to Grant dated Jan. 18, 2024 for European Application No. 21383130.8.
English translation of Chinese Office Action dated Mar. 15, 2025 for co-pending Chinese application No. 02280080597.8.

* cited by examiner

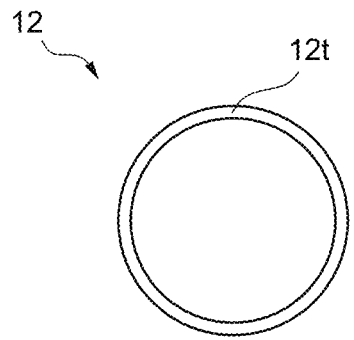
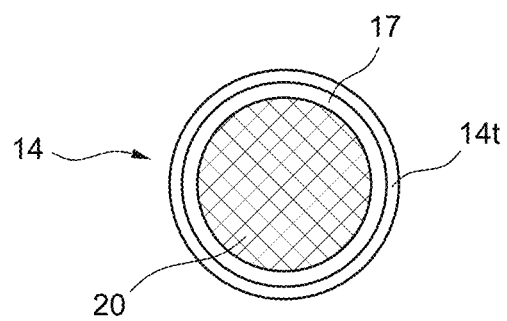
Fig. 5  Fig. 6
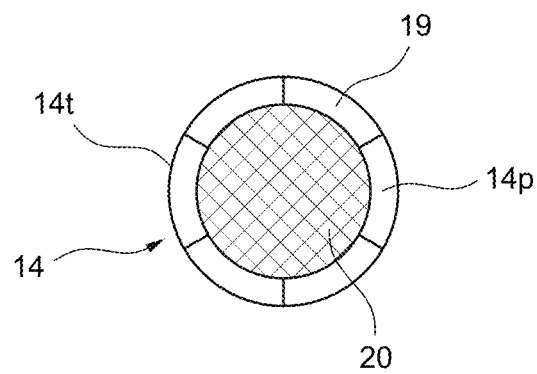
Fig. 7

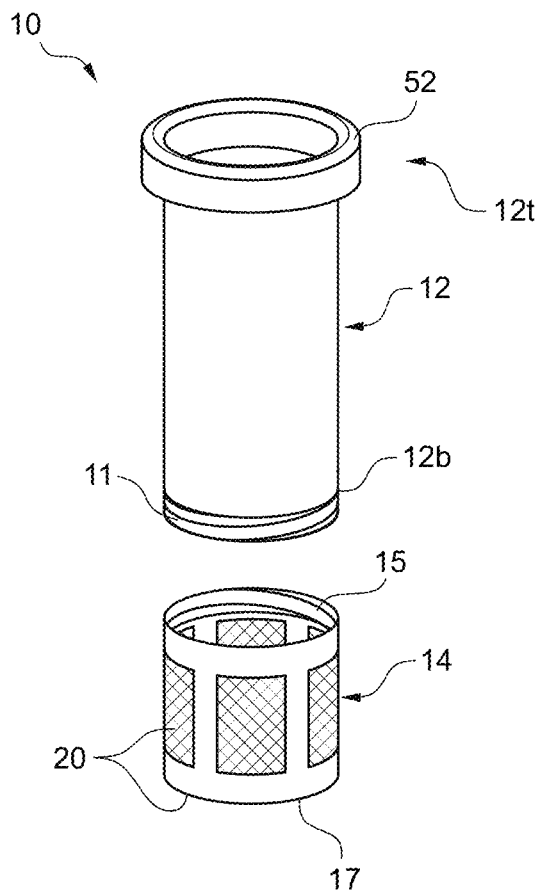
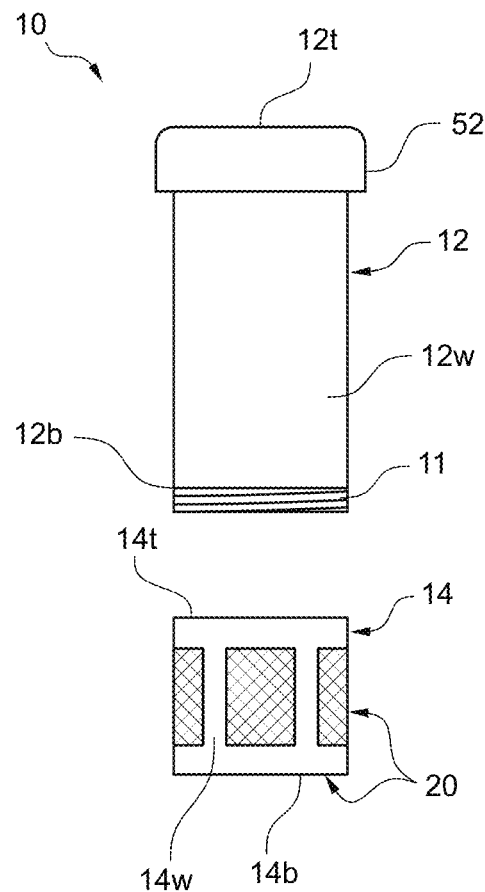
Fig. 13          Fig. 14
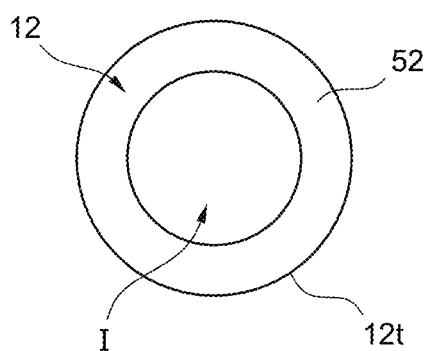
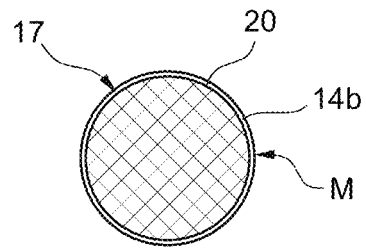
Fig. 15          Fig. 16

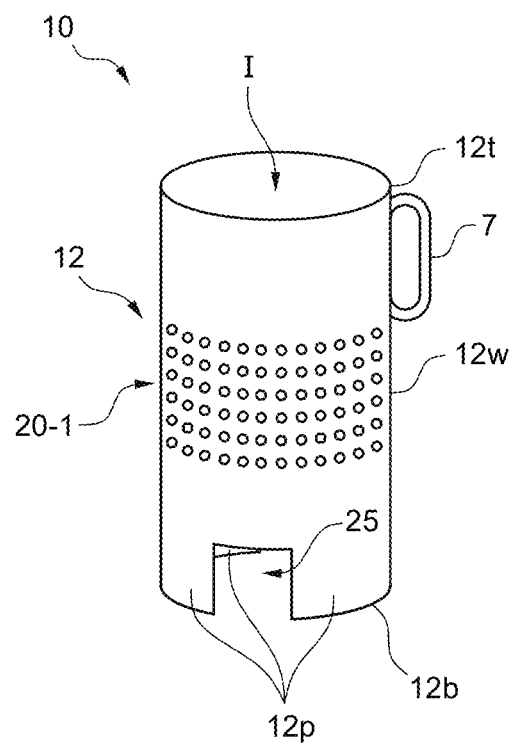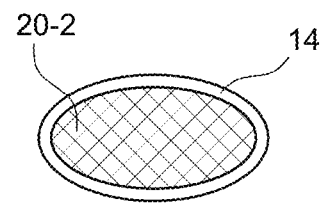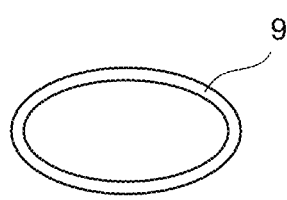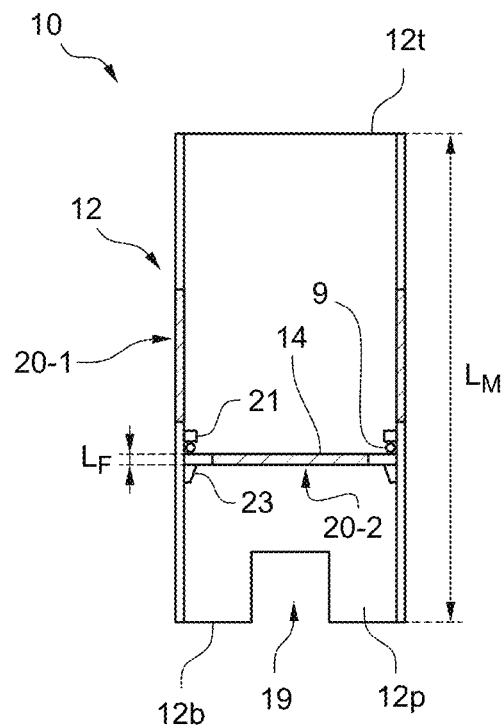
Fig. 17
Fig. 18
Fig. 19
Fig. 20

FILTERING BEAKER, KIT AND DEVICE FOR PRODUCING A LIQUID EMULSION

REFERENCE TO RELATED APPLICATIONS

This Application is a National Phase entry of International Application number PCT/EP2022/085316, filed on Dec. 12, 2022, which claims the benefit of European Application number 21383130.8, filed on Dec. 10, 2021. The contents of the above-referenced Patent Applications are hereby incorporated by reference in their entirety.

FIELD OF THE INVENTION

The present invention is in the field of domestic and industrial appliances for producing liquid emulsions such as liquid beverages, creams, sauces and the like in particular of the kind consumable by humans as food or drink. In particular, the invention refers to a filtering beaker for producing a liquid emulsion and to a related kit and device for producing a liquid emulsion using such filtering beaker.

BACKGROUND OF THE INVENTION

A device for beverage production developed by the present inventor is known from WO 2013/120813 A1. The device, which is shown in FIG. 1, is configured for producing a beverage using a blending element such as a hand-held blender and comprises a filtering beaker 2 having at least a filtering area 3 and a pestle 6. As explained in detail in the cited document, the operation of the device described therein consists in inserting the filtering beaker 2 into a suitable containing beaker 1, with an ingredient to be used for producing the beverage, for example fruits or nuts, received within the filtering beaker 2. A blender can then be inserted into the filtering beaker 2 and be used for crushing the ingredient received in the filtering beaker 2, thereby obtaining a liquid extract that is filtered through the filtering areas 3 of the filtering beaker 2 and collected in the containing beaker 1.

After the action of the blending element is completed, a solid remnant of the crushed ingredient remains within the filtering beaker 1, which is then pressed using the pestle 6 in order to dry it out and obtain as much liquid extract as possible from the original ingredient for the beverage. After this process is completed and the final beverage is obtained, a dried solid remnant of the crushed and pressed ingredient remains within the filtering beaker, which must be disposed of in order for the device to be ready for use again.

The filtering areas of the device disclosed in WO 2013/120813 A1 comprise filtering pores or a filtering mesh with a given opening size, and the degree to which the final beverage is filtered depends on the opening size used, which is fixedly determined for a given device when manufacturing the device.

SUMMARY OF THE INVENTION

The inventor developed a number of technical improvements for the filtering beaker and device disclosed in WO 2013/120813 A1, which have led to the present invention, which aims at improving the versatility and usability of the filtering beaker and device while reducing costs, both at a user end and at a manufacturing end. This technical aim is achieved by a filtering beaker according to claim 1, by a kit according to claim 13 and by a device according to claim 15. Preferred embodiments of the invention are defined in the dependent claims.

A first aspect of the invention refers to a filtering beaker for producing a liquid emulsion, in particular by the action of a blending device. The filtering beaker may be usable as a household appliance, as an industrial tool in the fool industry and/or as appliance for food/beverage preparation in a hospitality business. "Liquid emulsion" may refer herein in particular to a liquid mixture or blend of at least one solid ingredient and at least one liquid ingredient, for example to a vegetal drink made out of seeds, beans, cereals and/or nuts (solid ingredient(s)) and water (liquid ingredient) or a broth made out of meat and/or fish (solid ingredient) and water (liquid ingredient), but may also refer to a juice or extract made out of fruits or other liquid-containing groceries, for example, in the case of fruits, using their pulp (solid ingredient) and the water contained in the fruits or milk (liquid ingredient). Although the term "liquid" emulsion is used herein, it may also refer to viscous emulsions such as a cream and/or a dense sauce such as mayonnaise or the like, which may be more or less "liquid" depending on their viscosity. The liquid emulsion may for example be an ultrafine, pasty or even doughy emulsion.

The filtering beaker comprises a main body with a tubular geometry, which may in particular be configured for receiving therein a blending device for producing a liquid emulsion, such as a hand-held mixer or the like, which may or not be an electric device. "Tubular geometry" may refer herein in particular to a substantially hollow geometry formed by one or more sidewalls enclosing an inner space and laterally separating it from an outer space. A hollow interior volume of the tubular main body may in particular be free of any obstacles. The one or more sidewalls may longitudinally (axially) extend between a first longitudinal end (a top end) and a second longitudinal end (a bottom end) of the main body, which may in particular be open longitudinal ends connecting the inner space enclosed by the one or more sidewalls with an exterior of the main body.

The filtering beaker may for example have a substantially cylindrical geometry with a substantially circular cross-section, such that manufacturing the main body may for example comprise cutting a tubular piece of material such as metal or plastic at two different axial cutting positions, wherein the distance between the two cutting positions determines the longitudinal extension of the main body and such that many main bodies may be obtained from the initial tubular piece of material. However, other geometries than cylindrical and other cross-sections than circular are possible in a filtering beaker according to the invention, for example oval, square or polygonal.

In some embodiments, a cross-section of the main body may be constant throughout a longitudinal (axial) extension thereof. In other embodiments, a cross-section of the main body may vary over a longitudinal extension thereof. For example, the main body may have a substantially circular cross-section with a diameter that remains constant or that increases or decreases, in particular continuously, from one longitudinal end towards another longitudinal end, at least over a portion of the longitudinal extension of the main body. In an exemplary embodiment, the main body may have a substantially circular cross-section with a first diameter at a first longitudinal end thereof that continuously decreases to a second diameter smaller than the first diameter over a portion of the longitudinal extension of the main body towards the second longitudinal end thereof, thereby forming a widened portion of the main body at the first longitudinal end, such that the main body may have a frusto-conical geometry at least over a part of a longitudinal (axial) extension thereof. A widened portion of the main body at the first longitudinal end thereof defines a greater cross-section by which ingredients may be introduced into the filtering beaker and may hence simplify the task of introducing ingredients into the filtering beaker without risk of missing the cross-section of the filtering beaker.

The main body may be configured for receiving therein a blending device for producing the liquid emulsion. "Blending device" may refer herein to a device suitable for blending, crushing, squeezing and/or mixing at least one solid ingredient, preferably with at least one liquid ingredient, possibly by the action of rotating blades. The blending device may for example be or comprise a conventional household hand-held mixer but may also be or comprise a non-electric device, for example a mechanical hand-driven device.

The geometry of the main body may be such that it allows a blending device to be inserted into the inner space of the main body such that the blending device can be used for producing the liquid emulsion as will be explained below. The main body may correspondingly have an inner diameter of 5 cm to 40 cm, preferably 6 cm to 20 cm, more preferably 7 cm to 15 cm in particular at one open longitudinal end thereof, through which a blending device may be introduced into the filtering beaker, and over a portion of the longitudinal (axial) extension of the main body from said open longitudinal end. Having an inner diameter within the aforementioned ranges guarantees that the filtering beaker is suitable for receiving most blending devices available in the market, which typically have a maximal diameter—at the mixing head comprising the blades—of 6 cm to 6.5 cm in the case of domestic blending devices and of 6.5 cm to 9 cm in the case of professional blending devices used in hospitality businesses such as restaurants and in food production industries.

The filtering beaker further comprises a filtering body. The filtering body has a geometry matching the tubular geometry of the main body at least at a connecting portion of the filtering body, possibly throughout at least a part or all of the longitudinal extension of the filtering body. The filtering body may have a geometry, in particular a tubular or disc-like geometry, that matches the tubular geometry of the main body at the connecting portion thereof or throughout the entire longitudinal extension of the filtering body.

The filtering body is removably attachable to the main body by the connecting portion of the filtering body. The filtering body has a geometry that matches or corresponds to the geometry of the main body at least at the connecting portion in particular for the purpose of being attachable to the main body.

"A geometry matching the tubular geometry of the main body" as used herein, may imply that, when the filtering body is attached to the main body, the filtering body may have and/or cover a cross-section, in particular an inner cross-section, identical or at least similar to a cross-section, in particular an inner-cross section, of the main body.

In some embodiments, the entire cross-section of the filtering body may match a cross-section of the main body, i.e. the main body and the filtering body may have matching geometries both interiorly and exteriorly, such that the filtering body may form a longitudinal (axial) prolongation of the main body at least at the connecting portion, but possibly over a longer portion of the longitudinal extension of the filtering body, for example throughout the entire longitudinal extension of the filtering body. For example, the filtering body may have a tubular geometry and a tubular perimetral profile and/or cross-section of the filtering body may match a tubular perimetral profile and/or cross-section of the main body, in particular at the connecting portion by which the filtering body and the main body are mutually attachable, which may in particular correspond to a longitudinal end of the filtering body.

However, "a geometry matching the tubular geometry of the main body" as used herein, may also imply that, the filtering body may be integrated and/or received in the tubular geometry of the main body. For example, the filtering body may be disc-shaped and may be configured for being received within the tubular main body and/or connected thereto with a perimeter of the filtering body corresponding to a perimeter of the main body.

The fact that the filtering body has a geometry matching the tubular geometry of the main body at least at the connecting portion does however not necessarily imply that the geometries of the main body and that of the filtering body must be identical.

In embodiments in which the filtering body has a tubular geometry, one or more sidewalls of the filtering body and the one or more sidewalls of the main body may be smoothly connected at the connecting portion when the filtering body is attached to the main body, such that, for instance as seen from the outside, the geometry of the filtering beaker may be substantially free of any surface irregularity or longitudinal step. For example if the main body has a circular cross-section, the geometry of the filtering body "matching the tubular geometry of the main body" may imply that, at least at the connecting portion by which the filtering body is attachable to the main body, the filtering body may also have a circular-cross section with a diameter corresponding to a diameter of the circular-cross section of the main body at the corresponding longitudinal end thereof. The filtering body and the main body may have the same cross-section throughout their respective longitudinal (axial) extensions. In other related embodiments, the filtering body may for example have a substantially constant cross-section throughout a longitudinal extension thereof, while the main body may have a varying cross-section over a longitudinal extension thereof or a part of such longitudinal extension, in particular a cross-section that increases in size over at least a portion of the longitudinal extension of the main body with increasing distance from the filtering body.

When the filtering body is attached to the main body, the filtering body may be arranged next to and below the main body and/or within the main body, such that a blending device received in the filtering beaker may be totally or partly received in the main body. For example, if the filtering body has a tubular geometry, an upper part of the blending device may be received within the main body while a lower part of the blending device may be received in the filtering body, which lower part may in particular comprise rotary blades. The connecting portion may correspond to or comprise an open longitudinal end (a top end) of the tubular filtering body. A blending device can for example be received in the filtering beaker by extending throughout the longitudinal extension of the main body and by partly or totally extending into the filtering body when attached to the main body.

However, the operation of some embodiments may foresee that a blending device be received only in the main body of the filtering beaker. For example, if the filtering body has a disc-shaped geometry, a blending device received in the filtering beaker may be totally received in the main body. The connecting portion may then correspond to or comprise a perimeter of the disc-shaped filtering body, by which the filtering body is attachable to the tubular main body.

"Removably attachable" as used herein, may imply that the filtering body can be mechanically connected to the main body forming a stable mechanical connection able to withstand the action of a blending device received within the filtering beaker, in particular without the filtering body and the main body moving with respect to each other, but which can be selectively removed when intended, in particular without affecting the integrity and functionality of the main body or the filtering beaker. In other words, the filtering body and the main body can be mutually attached and detached a large number of times while remaining fully functional for the purposes of the present invention.

When the filtering body and the main body are mutually attached, a mechanical connection between the filtering body and the main body may in particular be fluid-tight. In some embodiments, the filtering beaker may comprise a sealing element, such as a sealing ring, arrangeable between the filtering body and the main body when mutually attached, in particular at the connecting portion of the filtering body. The sealing element may guarantee that a mechanical connection between the filtering body and the main body, when mutually attached, is fluid-tight, even during the action of a blending device received within the filtering beaker, thereby improving its functionality and reliability.

According to some embodiments, the filtering body may be removably attachable to the main body by means of a releasable coupling mechanism, preferably a threaded mechanism or a clipping mechanism. For example, the main body may comprise a threaded female profile at a longitudinal end thereof to be attached to the filtering body and the filtering body may comprise a corresponding threaded male profile at the open longitudinal end (e.g. the top end) thereof matching the threaded female profile of the main body. An inverse configuration—threaded female profile in the filtering body and threaded male profile in the main body—is also foreseen. Other types of mechanism such as a clipping mechanism, a snap mechanism or a bayonet mechanism are also foreseen as a releasable coupling mechanism according to related embodiments. The releasable coupling mechanism allows detaching the filtering body from the main body in a simple manner while ensuring a mechanically stable, reliable and possibly fluid-tight connection when the filtering body and the main body are mutually attached.

The filtering body is or comprises a base covering a cross-section of the filtering beaker. While the main body has open ends at both longitudinal ends thereof, the filtering body, in particular if configured with tubular geometry, may have one open longitudinal (axial) end, which comprises (or is) the connecting portion and at which the filtering body may be attached to the main body, but may be closed cross-sectionally at least by the base. In some embodiments, the base may be arranged at a longitudinal (axial) position that may correspond to the connecting portion or be longitudinally (axially) spaced apart from the connecting portion. In some embodiments, the base may correspond to a closed longitudinal end of the tubular filtering body, at which the at least one sidewall of the tubular filtering body may end.

Thus, the base of the filtering body that covers a cross-section of the filtering beaker may be arranged at one longitudinal (axial) end of the tubular filtering body but this needs not be the case. In some embodiments, the base of the filtering body that covers a cross-section of the filtering beaker may be longitudinally (axially) arranged between both longitudinal (axial) ends of the tubular filtering body.

For example, the at least one sidewall of the tubular filtering body may extend longitudinally (axially) from the connecting portion of the filtering body, which may be formed at one open longitudinal end of the tubular filtering body, to the longitudinal (axial) position of the base of the filtering body, and possibly beyond the longitudinal (axial) position of the base of the filtering body.

In some embodiments the filtering body may be the base covering the cross-section of the filtering beaker. The filtering body may for example have a disc-shaped geometry configured for covering a cross-section of the main body when the filtering body (the base) is attached to the main body, for example using a clipping mechanism. In such embodiments, the filtering body (the base) may be attachable to the main body at a bottom axial end of the main body and/or at an intermediate axial position within the main body, arranged between both axial ends of the main body.

The base of the filtering body covers the cross-section of the filtering body, possibly entirely, thereby geometrically closing an inner space of the filtering beaker from below when the main body and the filtering body are mutually attached. Thus, the inner space of the filtering beaker may be laterally enclosed by the sidewall(s) of the main body, possibly also by a longitudinal portion of the sidewall(s) of the filtering body (e.g. if the filtering body has a tubular geometry), and may be enclosed from below by the base, while remaining open from above at a longitudinal end of the main body distal from the filtering body. Notably, the fact that the base of the filtering body may geometrically close an inner space of the filtering beaker from below does not necessarily imply that the inner space of the filtering beaker is fluid tightly closed from below by the base of the filtering body. As will be explained later, the base of the filtering body may be configured for letting liquids and/or (some) solids through in some embodiments of the invention despite providing a geometrical closure of the inner space of the filtering beaker from below.

According to the invention, the filtering beaker, in particular the filtering body, comprises at least one filtering area for filtering and emulsifying a liquid emulsion being produced with the filtering beaker, in particular by the action of a blending device received therein. Notably, "liquid emulsion being produced" refers to a liquid emulsion that is in the process of being produced using the filtering beaker of the invention and can be different from the final liquid emulsion. The properties of the "liquid emulsion being produced", such as homogeneity, transparency or viscosity, may evolve due to the action of a blending device received within the filtering beaker as the mixing progress advances until the "liquid emulsion being produced" becomes the final liquid emulsion that is ready for human consumption and/or has the desired properties.

According to some embodiments, the at least one filtering area may for example comprise a filtering mesh, a filtering bag, and/or a plurality of filtering pores. In particular, the at least one filtering area may comprise at least one filtering mesh covering one or more windows in the filtering body and/or in the main body and/or a plurality of filtering openings formed in the filtering body and/or in the main body. In the case of a filtering mesh, which may be formed by interwoven mesh threads, for example made of fabric and/or a metal such as steel or iron, a filtering size may be defined by a mesh opening size (i.e. by a distance between adjacent mesh threads). A filtering bag may be arranged covering one or more openings in the filtering body, thereby forming the at least one filtering area. In the case of filtering pores, which may for example have a circular shape, a filtering size may correspond to a diameter of each of the filtering pores or at least to the biggest filtering pores. The filtering pores may for example be directly formed on the surfaces of the filtering body and/or of the main body, for example configured as microperforated plastic and/or metal surfaces of the filtering body and/or of the main body. "Filtering size" may refer herein to the maximum aperture or diameter of the filtering pores and/or filtering mesh. In other words, a "filtering size" X may imply that particles of a size up to X can move through the at least one filtering area, while particles with a size greater than X are not let through by the at least one filtering area.

Thanks to the presence of the at least one filtering area, the action of the blending device can cause a double effect:

As a first effect, the at least one filtering area has an emulsifying effect: driven by a blending device received within the filtering beaker, such as for instance a hand-held mixer, the ingredients being mixed are centrifuged in and out of the filtering beaker through the filtering areas in a turbulent flow, which leads to the formation of an homogeneous and smooth final liquid emulsion in which the ingredients used are mixed, in particular homogeneously mixed.

As a second effect, the at least one filtering area fulfils a filtering function: particles or remnants of solid ingredients received within the filtering beaker that are used for producing the liquid emulsion and having a size greater than a filtering size of the at least one filtering area are retained by the at least one filtering area within the filtering beaker and hence prevented from being present in the final liquid emulsion that can be collected outside the filtering beaker, in particular in a container in which the filtering beaker may be received (which may be a specifically designed container or a conventional container such as a glass or pot). Liquids and particles or remnants of said solid ingredients having a size less than or up to the filtering size may however get through the filtering areas and hence be present in the final liquid emulsion.

In preferred embodiments of the invention, the at least one filtering area may have a filtering size from 0.1 mm to 5 mm, preferably from 0.1 mm to 3 mm, more preferably from 0.1 mm to 0.8 mm. A filtering size in the aforesaid ranges optimises the combined action of the two effects of the at least one filtering area explained above. The filtering size can be adapted to a particular use depending on the ingredients to be emulsified. In particular, the at least one filtering area may have a filtering size of 0.1 mm to 0.25 mm, for example 0.15 mm, for producing a liquid emulsion out of water and seeds such as soybeans or tiger nuts. A filtering size of 0.25 mm to 0.45 mm, for example 0.3 mm may be used for producing a liquid emulsion out of water and cereals such a rice or oats. A filtering size of 0.45 mm to 0.8 mm, for example 0.5 mm may be used for producing a liquid emulsion out of water and nuts such as peanuts, hazelnuts or cashew nuts. A filtering size of 0.6 mm to 1.5 mm, for example 0.8 mm may be used for producing a liquid emulsion out fruits and/vegetables and optionally milk and/or water. A filtering size of 1 mm to 5 mm, for example of 2 mm or 3 mm, may be used for producing a liquid emulsion out of meat, vegetables and/or fish and water, for example for producing a broth, a cream, a soup, a purée and/or a sauce.

Other than the filtering beaker that was previously developed by the present inventor, which is depicted in WO 2013/120813 A1 as a one-piece filtering beaker, the filtering beaker according to the present invention comprises two components, the main body and the filtering body, which can be reliably and stably attached to each other, but which can also be selectively detached from each other. This has several advantages, both for the operation and for the manufacturing of the device.

At a user end, the possibility of detaching the filtering body from the main body may considerably simplify the task of disposing of the solid remnants that remain within the filtering beaker after being used for obtaining the liquid emulsion (and possibly after being pressed using a pestle or the like and/or the blending device itself). Using the closed-end one-piece filtering beaker disclosed in WO 2013/120813 A1, in order to extract the solid remnants from the interior of the filtering beaker, it may be necessary to use a spoon or the like, to turn the filtering beaker upside down and/or to slam the filtering beaker against a hard substrate, since the filtering beaker has a non-removable closed bottom end. In contrast, the filtering beaker according to the present invention allows easily removing the solid remnants from the interior of the filtering beaker by detaching the filtering body from the main body, whereby any solid remnants within the main body can be disposed of by simply pushing them out through the main body, for example using spoon, a pestle or a piston, and/or possibly the blending device itself. Any additional solid remnants present in or on the filtering body may be easily disposed of as well, in particular in embodiments in which a longitudinal extension of the main body may be greater than a longitudinal extension of the filtering body. The inventor found out that, due to the action of the blending device, most of the solid remnants tend to accumulate on the sidewalls of the main body and/or of the filtering body and can hence be easily removed from the interior of the filtering beaker once the base of the filtering beaker is removed, i.e. once the filtering body is detached from the main body.

Further, since the filtering size is determined by the at least one filtering area, which may in particular be formed in the filtering body, and the filtering body can be detached from the main body, it may be possible for a user of the filtering beaker of the invention to use the main body with different versions or models of the filtering body, for example depending on the requirements of the liquid emulsion to be produced. For example, the user may select a filtering body among filtering bodies having different filtering sizes, such that the filtering beaker can be easily and rapidly adapted to a specific use. The filtering baker of the invention can hence be configured for being usable with one single main body and a set of exchangeable filtering bodies.

At a manufacturing end, the structural independence of the filtering body main body and the filtering beaker from each other allows separating the production lines thereof. This is advantageous since manufacturing the filtering body, which may in particular comprise the at least one filtering area, may be notably more complex and costly than manufacturing the main body, which may have a relatively simple geometry and structure and require less involved industrial equipment and/or machines. Thus, thanks to the structural independence of the main body and the filtering body, the filtering beaker according to the present invention can be manufactured with increased efficiency, reduced complexity and reduced costs, inasmuch as more complex parts can be manufactured independently from less complex parts. Since one and the same main body may be used in combination with different types of filtering body, a manufacturer of the filtering beaker of the invention may profit from economies of scale with respect to the production of the main body.

In preferred embodiments of the invention, the at least one filtering area may be arranged on the base of the filtering body and/or on at least one sidewall of the filtering beaker, in particular of the filtering body. The main body may preferably be free of any filtering areas and all of the at least one filtering area of the filtering beaker may be arranged on the base of the filtering body and/or on at least one sidewall thereof. In some embodiments, all of the at least one filtering area may be arranged on the base of the filtering body and the at least one sidewall of the filtering body may be free of any filtering areas. In embodiments in which all or some of the at least one filtering area arranged on the base of the filtering body, a downward flow driven by the rotary motion of a blending device received within the filtering beaker, in particular by rotating blades thereof, can be used for enhancing the emulsifying effect, which can be further supported by filtering areas arranged on the at least one sidewall of the filtering body and/or of the main body.

However, in some embodiments, the at least one sidewall of the main body, in particular a bottom part thereof and/or a part thereof adjacent to the filtering body and/or to the base, may comprise one or more additional filtering areas, which may preferably be configured and structured like the one or more filtering areas of the filtering body. The one or more additional filtering areas may for example comprise a filtering mesh, a filtering bag, and/or a plurality of filtering pores. In embodiments in which the filtering body comprises one or more filtering areas, in particular on the base and/or on at least one sidewall of the filtering body, and the main body comprises at least one or more additional filtering areas, in particular on the at least one sidewall of the main body, preferably in the bottom part thereof and/or in said part thereof adjacent to the filtering body, a filtering size of the one or more filtering areas comprised in the filtering body may be different, preferably greater, from a filtering size of the one or more additional filtering areas comprised in the main body. Thus, the filtering size of the filtering body may be determinant for an effective filtering size of the filtering beaker, since it defines the largest filtering size and may be arranged closest to the blades of a blending device used for producing the liquid emulsion. The additional filtering areas in the main body may contribute to better flow conditions of one or more liquid ingredients used for producing the liquid emulsion from the interior of the filtering beaker to the exterior and vice versa.

According to preferred embodiments of the invention, the main body may have a longitudinal (axial) extension corresponding to at least 1.2 times, preferably at least 1.5 times, more preferably at least 2 times a longitudinal extension of the filtering body. This applies in particular to a filtering body having a tubular geometry and/or to embodiments in which the filtering body is arranged below and next the main body to (in the axial or longitudinal direction) when attached thereto. Thus, the longitudinal (axial) extension of the main body may be at least 20%, preferably at least 50%, more preferably at least 100% greater than a longitudinal (axial) extension of the filtering body. In some embodiments, the main body may have an even greater longitudinal (axial) extension as compared to the filtering body, for example of at least 5 or 10 times a longitudinal extension of the filtering body, for example when the filtering body is the base that covers the cross-section of the filtering beaker. The blending, crushing, squeezing and/or mixing effect of a blending device received within the filtering beaker may mostly originate at a bottom end of the blending device, at which for example rotating blades may be arranged. Therefore, it may be sufficient for the filtering body, which comprises the at least one filtering area, to have a reduced longitudinal extension as compared to the main body, in particular according to the aforementioned ratio ranges, since most of the blending, crushing, squeezing and/or mixing effect of the blending device may concentrate within the filtering body within such reduced longitudinal extension. A main body with a greater longitudinal extension implies a greater part of the filtering beaker of the invention having a simple structure and geometry and hence being easy to manufacture at reduced costs with less involved industrial equipment and/or machines, for which the overall production costs and manufacturing complexity of the filtering beaker of the invention can be substantially reduced.

In some embodiments, the main body may comprise or be made of one or more first materials and the filtering body may comprise or be made of one or more second materials, wherein the one or more second materials may be different from the one or more first material. The possibility of manufacturing the main body and the filtering body separately from each other due to their structural independence makes it possible to use different materials for the main body and the filtering body, respectively. For example, the first material may be or comprise a plastic and a metal and the second material may be a metal, such as steel, in particular stainless steel. The opposite case is also possible, i.e. the first material may be a metal, such as steel, in particular stainless steel, and the second material may be plastic. However, in some embodiments, the first material and the second material may be or comprise the same material(s), for example plastic or a metal such as steel, in particular stainless steel.

According to preferred embodiments of the invention, the filtering beaker may further comprise one or more standing portions for supporting the filtering beaker on a substrate when the filtering beaker stands on said substrate. The substrate may in particular correspond to the bottom of a container in which the filtering beaker may be received for producing the liquid emulsion, which may then accumulate in the container. The one or more standing portions may extend in a longitudinal (axial) direction of the filtering beaker such that, when the filtering beaker is standing on the substrate, a gap remains between the substrate and the filtering body and/or between the substrate the base. Thus, by virtue of the one or more standing portions, the base and/or the filtering body, in particular a bottom longitudinal (axial) end thereof, do not directly contact against the bottom of the container when the filtering beaker is received in the container standing on the bottom of the container. Instead, an intermediate gap is created between the bottom of the container and the filtering body and/or the base by the one or more standing portions. The one or more standing portions hence operate as standing legs of the filtering beaker, keeping the filtering body and/or the base of the filtering beaker elevated with respect to the bottom of a container in which the filtering beaker can be received. This gap or separation between the filtering body and/or the base and the bottom of the container (substrate) may allow a turbulent flow driven by a blending device received within the filtering beaker to be directed through a filtering area or filtering areas arranged on the base of the filtering body axially downwards within said gap or separation towards the bottom of the container. As a result, an improved emulsifying effect can be achieved and the usability of the filtering beaker is improved.

According to preferred embodiments of the invention, the one or more standing portions may correspond to portions of at least one sidewall of the filtering beaker, i.e. of the main body and/or of the filtering body and one or more openings may be formed in the at least one sidewall of the filtering beaker, i.e. in at least one sidewall of the main body and/or in at least one sidewall of the filtering body. The one or more openings may extend upwards in a longitudinal direction of the filtering body from a bottom end of the filtering beaker, i.e. from a bottom end of the main body and/or from a bottom end of the filtering body. The openings may extend upwards to a height H from the bottom end of the filtering beaker. The standing portions are hence formed between the one or more openings.

Optionally, the one or more openings may all have a same extension in a perimetral direction perpendicular to the longitudinal direction (e.g. may all cover the same angle in a cylindrical coordinate system). More preferably, the one or more openings and the standing portions may all have the same extension in the perimetral direction perpendicular to the longitudinal direction. In some embodiments, the height H may correspond to a distance in the longitudinal direction between the bottom end of the filtering body and the longitudinal position of the base of the filtering body, such that the standing portions of the at least one sidewall of the filtering body may longitudinally extend beyond the base of the filtering body and the one or more openings may longitudinally extend from the bottom end of the filtering body to the base.

A space region enclosed by the standing portions of the at least one sidewall of the filtering body fluidly communicates with an exterior thereof through the one or more openings. The base of the filtering body may hence longitudinally separate the inner space of the filtering beaker from the aforesaid space region enclosed by the standing portions of the at least one sidewall of the filtering body.

As previously explained, the standing portions can be used for letting the filtering beaker rest on them on the bottom of a container when the filtering beaker is received within a container for producing the liquid emulsion, which is to be collected in the container, such that the standing portions abut against the bottom of the container and act as "standing legs" of the filtering beaker. Thanks to the standing portions, a vertical interspace remains between the base of the filtering portion and the bottom of the container in which the filtering beaker is received when the filtering beaker rests on the bottom of the container. The interspace may have a longitudinal extension equal to or greater than the height H. This interspace may allow a turbulent flow driven by a blending device received within the filtering beaker to be directed through a filtering area or filtering areas arranged on the base of the filtering body, first axially downwards from the inner space of the filtering beaker into a space region enclosed by the standing portions, towards the bottom of the container, and then radially outwards through the one or more openings. As a result, an improved emulsifying effect can be achieved and the usability of the filtering beaker is improved.

The one or more openings of the filtering body may have a circular, square and/or polygonal shape. The one or more openings may be formed as a longitudinal recesses or indentations in the at least one sidewall of the filtering body arranged between adjacent standing portions. For example, the sidewall of a substantially cylindrical filtering body may have a crenelated structure, wherein each of the one or more openings may be formed as a quadrangular embrasure or recessed portion of the standing portion and may be evenly spaced, such that each of the one or more openings is arranged between two adjacent non-recessed portions (merlons) corresponding to standing portion of the sidewall of the filtering body.

In some preferred embodiments, the base of the filtering body, in particular when the filtering body has tubular geometry, may be or comprise a filtering element comprising one or more of the at least one filtering area. The filtering element may be removably attachable to the rest of the filtering body. The one or more filtering areas arranged in the filtering element may be configured as a filtering mesh and/or as a plurality of filtering pores. The filtering element may for example be or comprise a filtering disc comprising a disc-shaped filtering mesh.

The filtering element may be removably attachable to the at least one sidewall of the filtering body by means of a corresponding fastening mechanism, which may for example comprise a clipping mechanism, a snap mechanism or the like, and possibly one or more sealing elements, such as sealing rings, for implementing fluid-tightness in the connection of the filtering element to the rest of the filtering body. In particular, a sealing element arranged between the filtering element and the rest of the filtering body and/or between the filtering element and the main body, may guarantee that a connection between the filtering element and the filtering body and/or the main body is fluid-tight, even while a blending device received within the filtering beaker is active, such that no liquid leaks through said connection and instead flows through the 0

The filtering body may comprise a holding portion for holding the filtering element. For example, the filtering body may comprise a recess formed as one or more radial protrusions extending radially over part of a radial extension (thickness) of the filtering body, thereby creating a step-like profile and/or holding points on which the filtering element, for example a filtering disc, can be arranged, and possibly fixed in position by the corresponding fastening mechanism. In some embodiments, the filtering element may comprise at least one of the one or more filtering areas, whereas the main body and/or the rest of the filtering body (other than the filtering element) may be free of any filtering areas.

The configuration of a filtering beaker with a filtering element as described for this embodiment further enhances the aforementioned advantages achieved by the filtering beaker of the present invention. Flexibility of use is improved inasmuch as the filtering size of the filtering beaker may be selectively adapted by correspondingly exchanging only the filtering element, with no need of exchanging the rest of the filtering beaker, which may be used for filtering elements with different filtering sizes. Furthermore, the complexity in the manufacturing of the at least one filtering area may be concentrated in the manufacturing of the filtering element, whereby the manufacturing of the main body and possibly of the rest of the filtering body can be further simplified.

According to some embodiments, the filtering beaker may comprise one or more radial protrusions configured for acting as stoppers preventing a piston or pestle from directly pressing against the base when inserted into the filtering beaker for pressing solid ingredients received therein. The one or more radial protrusions may in particular protrude radially inwards from the at least one sidewall of the main body or of the filtering beaker.

In some preferred embodiments, the filtering beaker, in particular the main body, may comprise a handle for hand-holding the filtering beaker.

A second aspect of the invention refers to a kit for producing a liquid emulsion comprising a filtering beaker according to any of the embodiments of the first aspect of the invention, i.e. a filtering beaker with a main body and at least a filtering body according to any of the previously discussed embodiments. The kit may comprise a plurality of different filtering bodies each comprising at least one filtering area and being removably attachable to the main body. Additionally or alternatively, the kit may comprise a plurality of different bases of the filtering body configured as different filtering elements, each comprising at least one filtering area and being removably attachable to the rest of the (one) filtering body of the filtering beaker. The different filtering bodies of the plurality of filtering bodies and/or the different filtering elements of the plurality of filtering elements may differ from each other by a filtering size thereof. Thus, a user of a kit according to the present invention may always use the same main body and select a (whole) filtering body and/or a base of the filtering body having filtering areas with a selected filtering size, depending on the desired use.

A third aspect of the invention refers to a device for producing a liquid emulsion comprising a filtering beaker according to any of the embodiments of the first aspect of the invention and/or a filtering kit according to any of the embodiments of the second aspect of the invention.

The device according to the third aspect of the invention may further comprise a piston configured for being received within the filtering beaker and covering an internal cross section of the filtering beaker at least in part, preferably completely. The piston may in particular be a hand-held piston with an elongated grip portion and a piston head, wherein the piston head of the piston may have a cross-section corresponding to an internal cross-section of the filtering beaker, in particular of the main body thereof. In cases in which the filtering beaker may have the cross-section that varies along a longitudinal direction thereof, the head portion of the piston may have a cross-section corresponding to a minimal internal cross-section of the filtering beaker, in particular of the main body thereof. The piston can be used for removing solid remnants from the interior of the filtering beaker, in particular after detaching the filtering body from the main body, by dragging the solid remnants out of the main body, for example using a spoon, a pestle or piston and/or the blending device itself. The elongated grip portion of the piston may have a longitudinal extension greater than or equal than a longitudinal extension of the main body of the filtering beaker.

Additionally or alternatively, the device according to the invention may comprise a container configured for receiving the filtering beaker therein, such that a liquid emulsion being produced with the filtering beaker by the action of the blending device received within the filtering beaker can be collected in the container. In some embodiments, the device may comprise fastening means for fixating a position of the filtering beaker with respect to the container, in particular in order to prevent the filtering beaker from moving with respect to the container under the action of the blending device. The fastening means may be comprised in the filtering beaker and/or in the container.

In some preferred embodiments, a cross-section of the containing beaker may be greater than a cross-section of the filtering beaker such that, when the filtering beaker is received within the container, at least one sidewall of the filtering beaker is separated from at least one sidewall of the container by a separation distance. The separation distance may be from 1 cm to 15 cm, preferably from 2 cm to 10 cm.

BRIEF DESCRIPTION OF THE DRAWINGS

FIGS. 2-7 schematically illustrate a filtering beaker according to an embodiment of the first aspect of the invention.

FIG. 2 shows a perspective exploded view of the filtering beaker.

FIG. 3 shows a side view of the filtering beaker.

FIG. 4 shows a perspective view of the filtering beaker 10 when the main body and the filtering body are mutually attached.

FIG. 5 shows a top view of the main body of the filtering beaker.

FIG. 6 shows a top view of the filtering body of the filtering beaker.

FIG. 7 shows a bottom view of the filtering body of the filtering beaker.

FIG. 8 shows a perspective exploded view of the filtering beaker.

FIG. 9 shows a side view of the filtering beaker.

FIG. 10 shows a top view of the main body of the filtering beaker.

FIG. 11 shows a bottom view of the main body of the filtering beaker.

FIG. 12 shows a bottom view of the filtering body of the filtering beaker.

FIGS. 13-16 schematically illustrate a filtering beaker according to a further embodiment of the first aspect of the invention.

FIG. 13 shows a perspective exploded view of the filtering beaker.

FIG. 14 shows a side view of the filtering beaker.

FIG. 15 shows a top view of the main body of the filtering beaker.

FIG. 16 shows a top view of the filtering body of the filtering beaker.

FIGS. 17-20 schematically illustrate a filtering baker according to a further embodiment of the first aspect of the invention.

FIG. 17 shows a perspective view of the main body.

FIG. 18 shows a perspective view of the filtering body.

FIG. 19 shows a perspective view of a sealing ring.

FIG. 20 shows a cross-sectional view of the filtering beaker with the filtering body of FIG. 18 attached to the main body of FIG. 17.

FIG. 23 shows a perspective view.

FIG. 24 shows a cross-sectional side view of the filtering device when a blending device is received in it.

FIG. 25 shows a side view of the main body of the filtering beaker of the filtering device with the piston received in it.

DESCRIPTION OF PREFERRED EMBODIMENTS OF THE INVENTION

Figure 1:
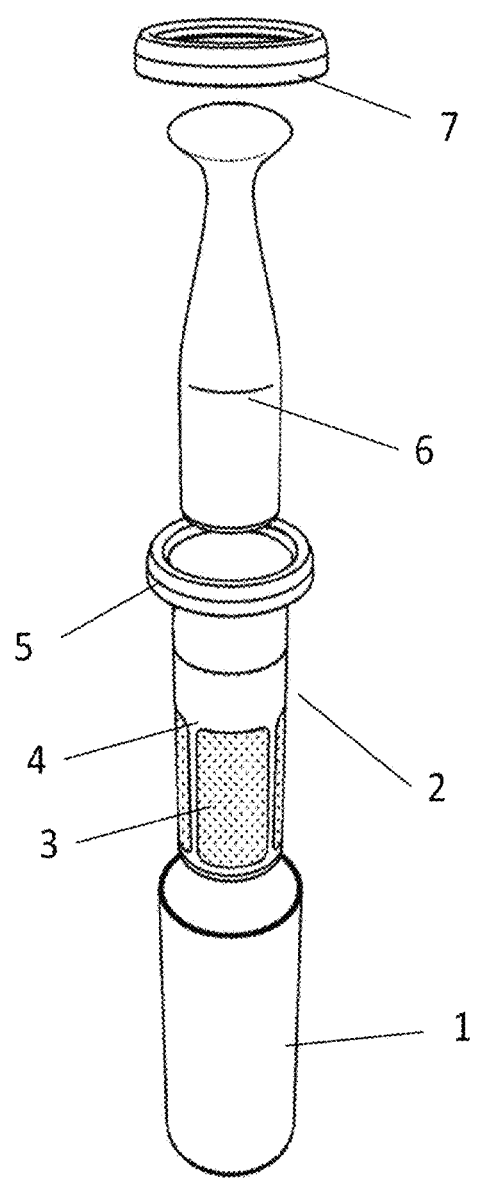
FIG. 1 reproduces a device for beverage production known from prior art.

For the purposes of promoting an understanding of the principles of the invention, reference will now be made to specific preferred embodiments illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to someone skilled in the art to which the invention relates within the scope defined by the claims.

FIG. 1 shows a device for beverage production known from WO 2013/120813 A1 discussed above. The device includes a filtering beaker 2 which is configured as a one-piece device. As a consequence, it is difficult to dispose of solid rests received within the filtering beaker 2 after the production of a beverage out of solid ingredients with the filtering beaker 2. Further, the filtering areas 3 are incorporated into the filtering beaker 2, for which it is not possible to select different filtering areas, having for example different filtering sizes, for producing different beverages using the filtering beaker 2.

Figure 2:
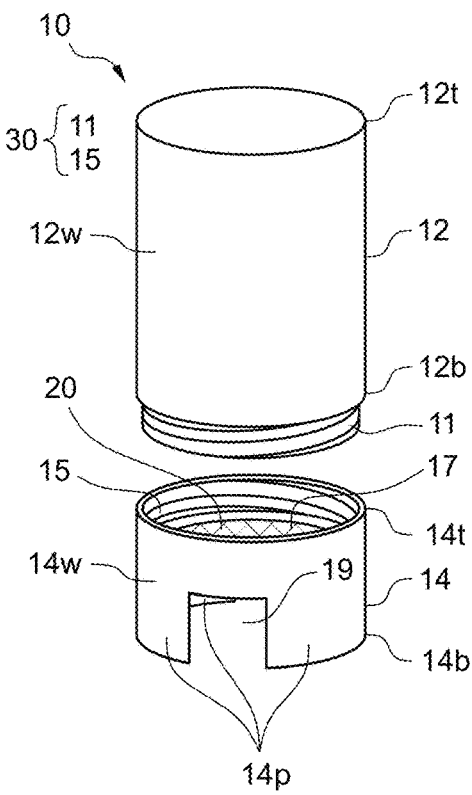

FIG. 2 shows a schematic perspective view of a filtering beaker 10 according to some embodiments of the invention. The filtering beaker 10 comprises a tubular main body 12 and a filtering body 14, which in this embodiment is configured as a tubular filtering body 14. The main body 12 has a substantially cylindrical geometry, i.e. has constant substantially circular cross-section and one sidewall 12w that extends axially (longitudinally) between a top end 12t and a bottom end 12b of the main body 12. The main body 12 is completely hollow. The top end 12t and the bottom end 12b are both open ends of the main body 12.

The filtering body 14 has a tubular geometry that matches the tubular geometry of the main body 12, which in the present embodiment implies that, like the main body 12, the filtering body 14 also has a substantially cylindrical geometry with a circular cross-section of substantially the same shape and size as the circular cross-section of the main body 12, both internally and externally.

Figure 3:
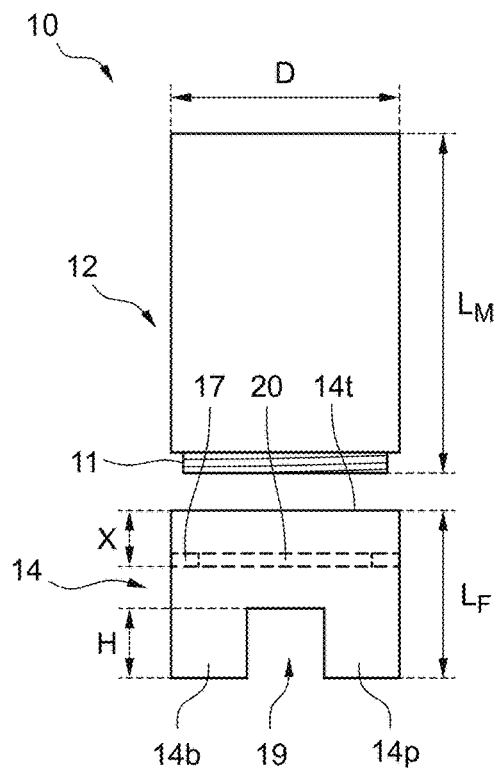

FIG. 3 represents a schematic lateral view of the filtering beaker 10 of FIG. 2. As shown in FIG. 3, the main body 12 has a longitudinal extension $L_M$, i.e. an extension in the axial direction between the top end 12t and the bottom end 12b thereof, that corresponds to about 2 times a longitudinal extension $L_F$ of the filtering beaker 14. In the exemplary embodiment illustrated in FIG. 3, both the main body 12 and the filtering body 14 have an outer diameter D of 9 cm. The longitudinal (axial) direction of the main body 12 and the filtering body 14 corresponds to the vertical direction on the paper for FIGS. 2, 3, 4 (and also for FIGS. 8, 9 13, 14 17, 18 19, 20 and 21).

The main body 12 and the filtering body 14 can be attached to each other by means of a releasable coupling mechanism 30 that is implemented in the exemplary embodiment shown in FIGS. 2-7 as a threaded mechanism comprising a male threaded profile 11 exteriorly arranged at the bottom end 12b of the main body 12 and a female threaded profile interiorly arranged at a connecting portion 15 (at the top end 14t) of the filtering body 14. By means of the coupling mechanism 30, the main body 10 can be screwed into the receiving portion 15 of the filtering body 14 such that a mechanically stable but still releasable connection between the filtering body 14 and the main body 12 is formed, which can further be fluid-tight.

In other related embodiments, a similar threaded mechanism may comprise a male threaded profile that may be exteriorly arranged at the connecting portion 15 of the filtering body 14 and a female threaded profile may be interiorly arranged at the bottom end 12b of the main body 12. In any case, the filtering body 14 and the main body 12 can be easily but securely attached to each other or detached, similarly to the upper and lower components of a conventional moka pot.

Figure 4:
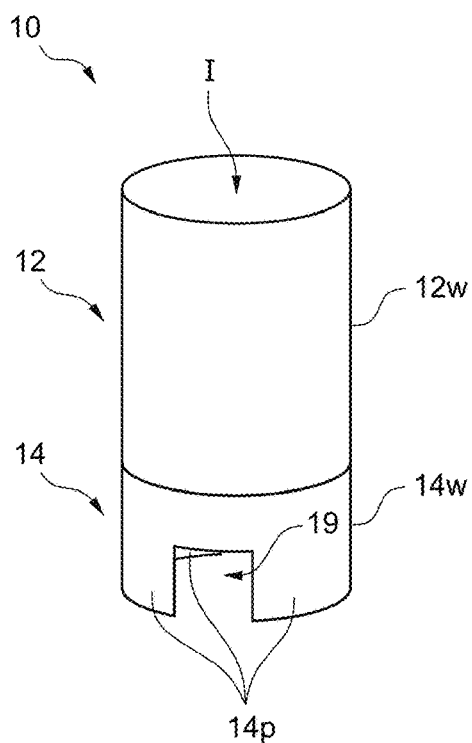

FIG. 4 shows a schematic perspective view of the filtering beaker 10 when the main body 12 and the filtering body 14 are mutually attached. As seen in FIG. 4, when the main body 12 and the filtering body 14 are mutually attached, the sidewall 12w of the main body 12 and the sidewall 14w of the filtering body 14 form a continuous smooth surface, since the tubular geometry of the filtering body 14 matches the tubular geometry of the main body 12.

The filtering body 14 comprises a base 17 that completely covers a cross-section of the filtering body 14. In the embodiment shown in FIGS. 2-7, the base 17 has a circular shape corresponding to the internal circular cross-section of the filtering body 14. As indicated in FIG. 3 with a dashed line, the base 17 of the filtering body 14 can be arranged at distance X from an upper end 14t of the filtering body 14 in the longitudinal direction. The base 17 is arranged in an axial (longitudinal) position between the connecting portion 15 (at the top end 14t of the filtering body 14) and a bottom end 14b of the filtering body 14. However, in other similar or related embodiments, the base 17 can be arranged at a different longitudinal position, for example at the top end 14t of the filtering body 14 or at the bottom end 14b of the filtering body 14 (in particular in embodiments not having the openings 19 to be described further below for the present embodiment). In other words, the value of the distance X can range between substantially 0 and substantially $L_F$ in different embodiments.

The base 17 geometrically closes an inner space I (cf. FIG. 4) of the filtering beaker 10 at one axial (longitudinal end), such that the inner space I of the filtering beaker 10 is laterally enclosed by the sidewall 12w of the main body 12, by a portion of the sidewall 14w of the filtering body 14 having an extension X in the longitudinal direction as indicated in FIG. 3, wherein the inner space I is further enclosed from below by the base 17 and is open from above, at the top end 12t of the main body 12. Thus, the overall extension of the inner space of the filtering beaker 10 enclosed by the sidewalls 12w and 14w of the main body 12 and the filtering body 14 respectively is $L_M+X$, as seen in FIG. 3.

The base 17 comprises a filtering area 20, which in the exemplary embodiment represented in FIGS. 2-6 is configured as a filtering mesh made of steel threads that are interwoven forming a square grid with openings having a regular aperture of 150 μm. The filtering area 20 of the base 17 covers the entire cross-section of the base 17 (and hence of the filtering body 14) with the exception of a thin perimetral boundary, having for example a radial extension of 1 cm or less, by which the base 17 is fixed to the rest of the filtering body 14.

As seen in FIGS. 2-4, the filtering body 14 further comprises a plurality of openings 19 formed as curved quadrangular-shaped openings in the sidewall 14w of the filtering body 14 extending from the bottom end 14b of the filtering body 14 longitudinally upwards up to a height H over the bottom end 14b (cf. FIG. 3). The openings 19 are curved inasmuch as they are formed in the curved (circular) sidewall 14w of the filtering body 14. In the embodiment illustrated in FIGS. 2-7, the height H is less than a distance between the base 17 and the bottom end 14b of the filtering body 14. However, in other related embodiments, the height H may substantially correspond to a distance between the base 17 and the bottom end 14b of the filtering body 14, such that the openings 19 can extend all the way from the bottom end 14b of the filtering body 14 to the longitudinal (axial) position of the base 17. In the exemplary embodiment illustrated in FIGS. 2-7, the filtering body 14 comprises three openings 19, however, other related embodiments may have more or fewer openings, for example one, two, four, five or a higher number.

Due to the presence of the openings 19, the sidewall 14w of the filtering body 14 has different extensions in the longitudinal direction at different positions around the perimeter of the filtering body 14. In those perimetral positions in which an opening 19 is formed, the sidewall 14w has a longitudinal extension $L_F$–H (cf. FIG. 3). In those perimetral positions in which no opening 19 is formed, the sidewall 14w has a longitudinal extension $L_F$ (cf. FIG. 3) and each portion of the sidewall 14w extending between adjacent openings 19 forms a standing portion 14p of the sidewall 14w of the filtering body 14.

Thus, the tubular cylindrical filtering body 14 of the embodiment illustrated in FIGS. 2-7 has a crenelated structure, wherein each of the one or more openings 19 is formed as an embrasure or recess of the sidewall 14w of the filtering body 14 and is arranged between two adjacent non-recessed portions (merlons) of the sidewall 14w of the filtering body 14 corresponding to respective standing portions 14p of the filtering beaker 10.

If the filtering beaker 10 is placed within a container, such as a glass or pot, with the standing portions 14p resting on a base of such container, i.e. acting as "feet" of the filtering beaker 10, the standing portions 14 laterally enclose a space region that is also enclosed from above by the base 17 of the filtering body 14 and from below by the base of the container. This space region is fluidly connected to the exterior through the openings 19 and to the interior space I through the at least one filtering area 20 of the base 17. When a blending device received within the filtering beaker 10 is in operation, the rotating blades thereof may be arranged right over the base 17 and may generate and drive a turbulent flow directed downwards through the filtering area 20 of the base 17 towards the bottom of the container and then radially outwards through the openings 19.

FIG. 5 shows a top view of the main body 12 of FIGS. 2-4, corresponding to a top end 12t of the main body 12 having a circular cross-section. A bottom view would be similar or identical to the top view shown in FIG. 5, but would instead show a bottom end 12b of the main body 12.

FIG. 6 shows a top view of the filtering body 14 of FIGS. 2-4, corresponding to a top end 14t of the filtering body 14 having a circular cross-section. From this top view, the base 17 is visible, which is attached to the sidewall 14w of the filtering body 14 and comprises the filtering area 20 having a diameter slightly smaller than a diameter of the base 17.

FIG. 7 shows a bottom view of the filtering body 14 of FIGS. 2-4, corresponding to a bottom end 14b of the filtering body 14 having a circular cross-section. From this top view, the filtering area 20 of the base 17 is visible. Also visible are the three openings 19 and three standing portions 14p, formed as portions of the sidewall of the filtering body 14. In the embodiment under consideration, all three openings 19 and all three standing portions 14p cover equal angles of 60° about the centre of the circular-cross section of the filtering body 14. In other related embodiments, different numbers of openings 19 and/or standing portions 14p and or different angular extensions thereof are possible. In particular, the openings 19 need not necessarily have the same angular extension and/or be evenly spaced.

In the embodiment shown in FIGS. 2 to 7, the main body 12 and the filtering body 14 can be made or comprise the same plastic material. However, in other embodiments the main body 12 and the filtering body 14 can be made of or comprise different materials. For example, the main body can be made of a food-compatible plastic while the filtering body can be made of or comprise stainless steel. The coupling mechanism 30 can be made of the same material or of a different material as (the rest of) one or both of the main body 12 and the filtering body 14.

FIGS. 8 to 12 show schematic views of a filtering beaker 10 according to a further embodiment of the invention, which shares most of the structural characteristics that have been described above for the embodiment illustrated in FIGS. 2 to 7, whence identical reference numerals are used for indicating identical or related components. Unless otherwise specified, the filtering beaker 10 according to the exemplary embodiment illustrated in FIGS. 8 to 12 may be assumed to have identical or similar features and characteristics as the exemplary embodiments described above with respect to FIGS. 2 to 7.

One of the differences between the filtering beaker 10 according to the exemplary embodiment illustrated in FIGS. 8 to 12 and the filtering beaker 10 according to the exemplary embodiments described above with respect to FIGS. 2 to 7 is that, in the exemplary embodiment illustrated in FIGS. 8 to 12, the filtering body 14 has no openings and no standing portions (cf. FIGS. 2-4) formed therein. Therefore, the sidewall 14w of the filtering body 14 has the same extension in the longitudinal direction throughout the perimeter thereof.

A further difference is that the releasable coupling mechanism 30 is configured in the exemplary embodiment illustrated in FIGS. 8 to 12 as a bayonet mechanism comprising a plurality of radial protrusions 15' at the top end 14t of the filtering body configured for being received and locked within a corresponding plurality of L-shaped slots 11' formed at the bottom end 12b of the main body 12. In the exemplary embodiment shown, two radial protrusions 15' and two corresponding L-shaped slots 11' are shown, although their number can different, in particular higher, in other related embodiments.

The filtering beaker 10 of the exemplary embodiment illustrated in FIGS. 8 to 12 comprises a sealing ring 9 configured for being arranged between the filtering body 14 and the main body 12 when the filtering body 14 and the main body 12 are mutually attached in order to improve a fluid-tightness of a mechanical connection between the filtering body 14 and the main body 12. The sealing ring 9 can be made of a rubber material.

A further difference is that in the exemplary embodiment illustrated in FIGS. 8 to 12, the base 17 is not arranged at an intermediate longitudinal position between the bottom end 14b and the top end 14t of the filtering body 14, but instead at the bottom end 14b, thereby closing the tubular filtering body 14 from below, such that an inner space I of the filtering beaker 10 is fully surrounded be the sidewall 12w of the main body 12 and by the sidewall 14w of the tubular filtering body 14.

Further, in the exemplary embodiment illustrated in FIGS. 8 to 12, filtering areas 20 are arranged in the base 17 and also on the sidewall 14w of the filtering body 14 and comprise a plurality of filtering pores that are formed in the base 17 and the sidewall 14w of the filtering body 14, respectively. The filtering pores of the filtering areas 20 can have a diameter of for example 150 μm or any other of the filtering sizes described above for a filtering beaker according to the present invention.

Figures 8, 9:
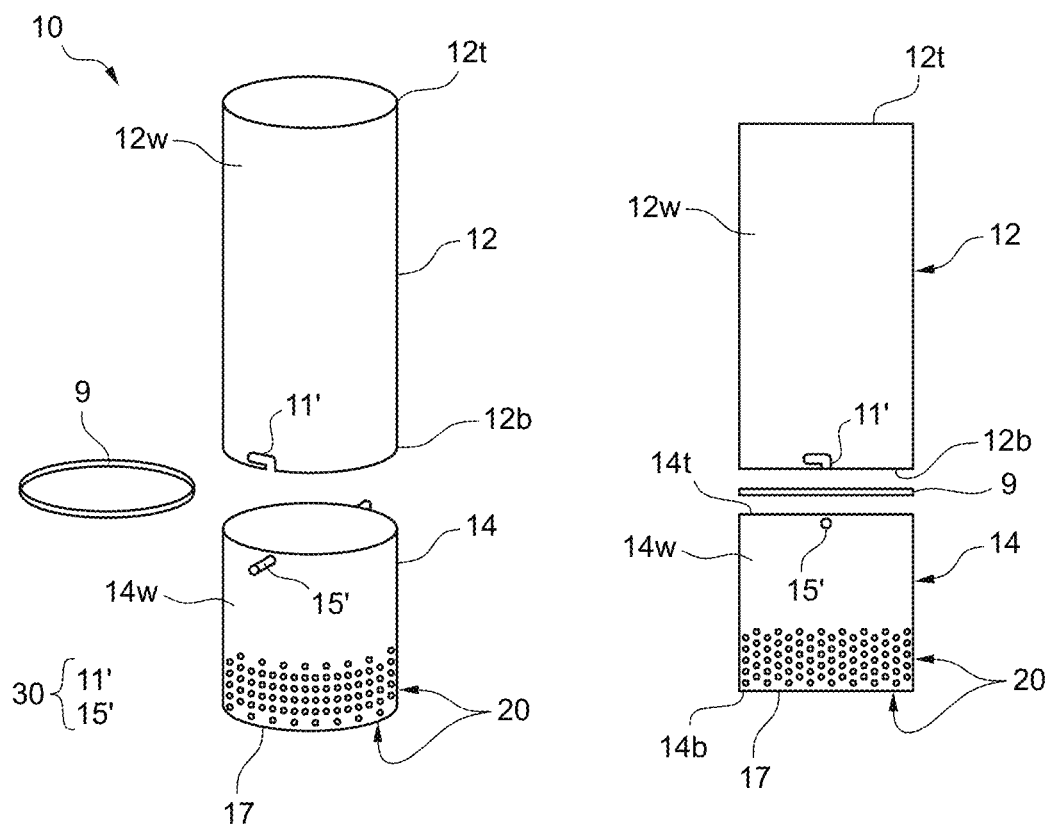
FIGS. 8-12 schematically illustrate a filtering beaker according to a further embodiment of the first aspect of the invention.

FIG. 9 shows a schematic side view of the filtering beaker 10 of FIG. 8, wherein the sealing ring 9 is arranged between the filtering body 14 and the main body 12.

Figures 10, 11, 12:
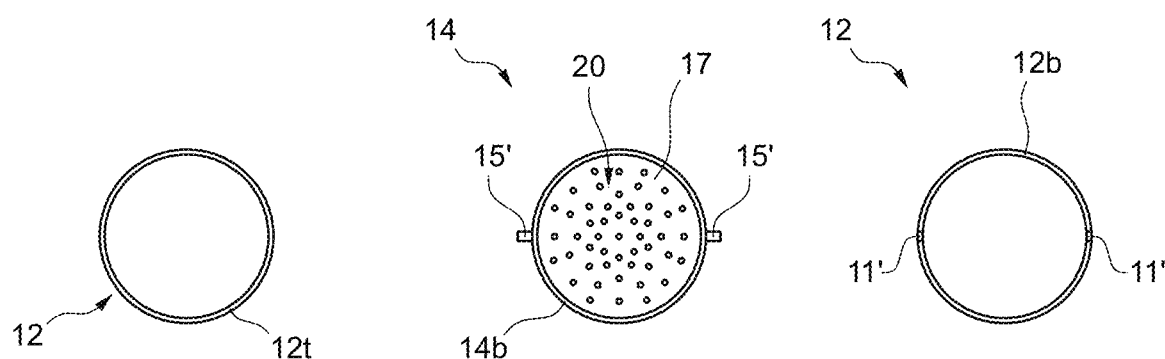

FIG. 10 shows a top view of the main body 12 of FIGS. 8 and 9, in which the top end 12*t* of the main body 12 can be seen. FIG. 11 shows a schematic bottom view of the main body 12 of FIGS. 8 to 10, in which the bottom end 12*b* of the main body 12 and the two L-shaped slots 11' formed therein can be seen.

FIG. 12 shows a bottom view of the filtering body 14 of FIGS. 8 and 9, in which the bottom end 14*b* of the filtering body 14, at which the base 17 is arranged, can be seen. The base 17 comprises part of the filtering pores of the filtering areas 20, the rest being formed in the sidewall 14*w* of the filtering body 14. Also seen in FIG. 12 are the two radial protrusions 15 of the bayonet mechanism 30 configured for being received and fastened within the L-shaped slots 11' of the main body 12. A top view of the filtering body 14 would be identical to the bottom view shown in FIG. 12.

FIGS. 13 to 16 show schematic views of a filtering beaker 10 according to a further embodiment of the invention, which shares most of the structural characteristics that have been described above for the embodiment illustrated in FIGS. 2 to 7 and/or for the embodiment illustrated in FIGS. 8 to 12, whence identical reference numerals are used for indicating identical or related components. Unless otherwise specified, the filtering beaker 10 according to the exemplary embodiment illustrated in FIGS. 8 to 12 may be assumed to have identical or similar features and characteristics as the exemplary embodiments described above with respect to FIGS. 2 to 7 and with respect to FIGS. 8 to 12.

FIG. 13 shows a schematic perspective view of the filtering beaker 10 and FIG. 14 shows a corresponding schematic side view. One of the differences between the filtering beaker 10 according to the exemplary embodiment illustrated in FIGS. 13 to 16 and the filtering beaker 10 according to the exemplary embodiments described above with respect to FIGS. 2 to 7 or FIGS. 8 to 12 is that, in the exemplary embodiment illustrated in FIGS. 13 to 16, the filtering areas 20 of the filtering body 14 are configured as filtering meshes, like in the exemplary embodiment discussed with respect to FIGS. 2 to 7, but the filtering areas 20 are now arranged on the base 17, which is arranged at the bottom end 14*b* of the tubular filtering body 14, like in the embodiment described above with respect to FIGS. 8 to 12, and also on the sidewall 14*w* of the filtering body 14. The filtering areas 20 arranged on the sidewall 14*w* of the filtering body 14 cover rectangular openings formed in the sidewall 14*w*.

In the exemplary embodiment illustrated in FIGS. 13 to 16, the coupling mechanism 30 is configured as a threaded mechanism 30 like in the exemplary embodiment illustrated in FIGS. 2 to 7, comprising a male threaded profile 11 arranged at the bottom end 12*b* of the main body that can be screwed into a female threaded profile arranged at the connecting portion 15 (at the top end 14*t*) of the filtering body 14.

A further difference between the filtering beaker 10 according to the exemplary embodiment illustrated in FIGS. 13 to 16 and the filtering beaker 10 according to the exemplary embodiments described above with respect to FIGS. 2 to 7 or FIGS. 8 to 12 is that, in the exemplary embodiment illustrated in FIGS. 13 to 16, the main body 12 comprises, at its top end 12*t*, a flange 52 configured for acting as fastening means for fixating a position of the filtering beaker 10 with respect to a container in which the filtering beaker 10 may be received by receiving therein an upper rim of the container. The flange functionally corresponds to the rim 5 known from the device described in WO 2013/120813 A1 (cf. FIG. 1). The size and shape of the flange 52 may hence be correspondingly adapted to match the geometry of the rim of a particular container. When the filtering beaker 10 is fixated to a container by the flange 52, the bottom end 14*b* of the filtering body 14 may or not rest on a base of the container.

FIG. 15 shows a top view of the main body 12 of the filtering beaker 10 of FIGS. 13 and 14, in which the top end 12*t* of the main body 12 can be seen, in which the flange 52 is formed.

FIG. 16 shows a bottom view of the filtering body 14 of the filtering beaker 10 of FIGS. 13 and 14, in which the bottom end 14*b* of the filtering body 14 can be seen, at which the base 17 is arranged containing part of the filtering areas 20 configured as a filtering mesh, the rest of the filtering areas being formed on the sidewall 14*w* of the filtering body 14 as windows in the sidewall 14*w* of the filtering body 14 covered by the filtering mesh, as shown in FIGS. 13 and 14.

FIGS. 17 to 20 show schematic views of a filtering beaker 10 according to a further embodiment of the invention, which shares some of the structural characteristics that have been described above for the embodiments illustrated in FIGS. 2 to 7, 8 to 12 and 13 to 16, whence identical reference numerals are used as appropriate for indicating identical or related components.

One main difference between the filtering beaker 10 according to the exemplary embodiment illustrated in FIGS. 17 to 20 and the previously described embodiments of the filtering beaker 10 is that, in the exemplary embodiment illustrated in FIGS. 17 to 20, the filtering body 14 does not have a tubular geometry but instead has a disc-shaped geometry and is configured as the base of the filtering beaker 10. In this embodiment, the main body 10 has a tubular geometry and comprises, at its bottom end 12*b*, a plurality of standing portions 12*p* that functionally correspond to the standing portions 14*p* of the embodiment illustrated in FIGS. 2 to 7, but which are formed in the main body 12, as part of the sidewall 12*w* of the main body 12, and not in the filtering body 14.

The standing portions 12*p* extend in the longitudinal direction of the filtering beaker 10 and the filtering beaker 10 can stand on the bottom of a container using the standing portions 12*p* when being received in said container. In such situation, the presence of the standing portions 12*p* implies that a gap remains between the bottom of the container and the filtering body 14, which forms the base of the filtering beaker 10 and covers a cross-section thereof. The aforesaid gap corresponds to a vertical space between the bottom end 12*b* and the filtering body 14, which is partly surrounded by the standing portions 12*p* and by the openings 19 that are formed between neighbouring standing portions 12*p*.

The filtering body 14 is removably attachable to the main body 12 by means of a clipping mechanism 23. The disc-shaped filtering body 14 can be introduced into the main body 12 through the bottom end 12*b* and be moved upwards past a biased clipping mechanism 23 that lets the filtering body 14 through but locks it in position between the clipping mechanism 23 and a holding portion 21 of the filtering beaker 10, which is the present exemplary embodiment is configured as an internal radial protrusion 21 of the main body 10. A sealing ring 9 is arranged between the filtering body 14 and the internal radial protrusion 21.

As shown in FIG. 20, in this exemplary embodiment, the filtering body 14 is arranged at an intermediate longitudinal position between the top end 12*t* and a bottom end 12*b* of the main body 12 and a longitudinal extension Ly of the tubular main body 10 is much larger than a longitudinal extension $L_F$ of the disc-shaped filtering body 14 ($L_M$>20 $L_F$).

When the filtering body 14 is attached to the main body 12, the filtering body 14, which forms the base of the filtering beaker 10, is received within the main body 10. The filtering body 14 has a disc-shaped geometry that matches the tubular geometry of the main body 12, which in this case means that the disc-shaped filtering body 14 entirely covers the internal circular cross-section of the tubular main body 12.

A further difference between the filtering beaker 10 according to the exemplary embodiment illustrated in FIGS. 17 to 20 and the previously described embodiments of the filtering beaker 10 is that, in the exemplary embodiment illustrated in FIGS. 17 to 20, the main body comprises a first filtering area 20-1 formed in a portion of the sidewall 12w that is adjacent to and over the filtering body 14 (cf. FIG. 20), and the filtering body comprises a second filtering area 20-2. The first filtering area 20-1 has a first filtering size, for example 150 µm, and the second filtering area 20-2 has a second filtering size greater than the first filtering size, for example 300 µm or 500 µm. In other related embodiments, the first filtering area 20-1 formed of the sidewall 12w may vertically extend over a greater part of a vertical extension of the sidewall 12w, i.e. may extend up to a point further away from the filtering body 14 as compared to the exemplary embodiment shown in FIGS. 17-20.

In the exemplary embodiment shown in FIGS. 17-20, the filtering baker 10 further comprises a handle 7 for handholding the filtering beaker 10.

Figure 21:
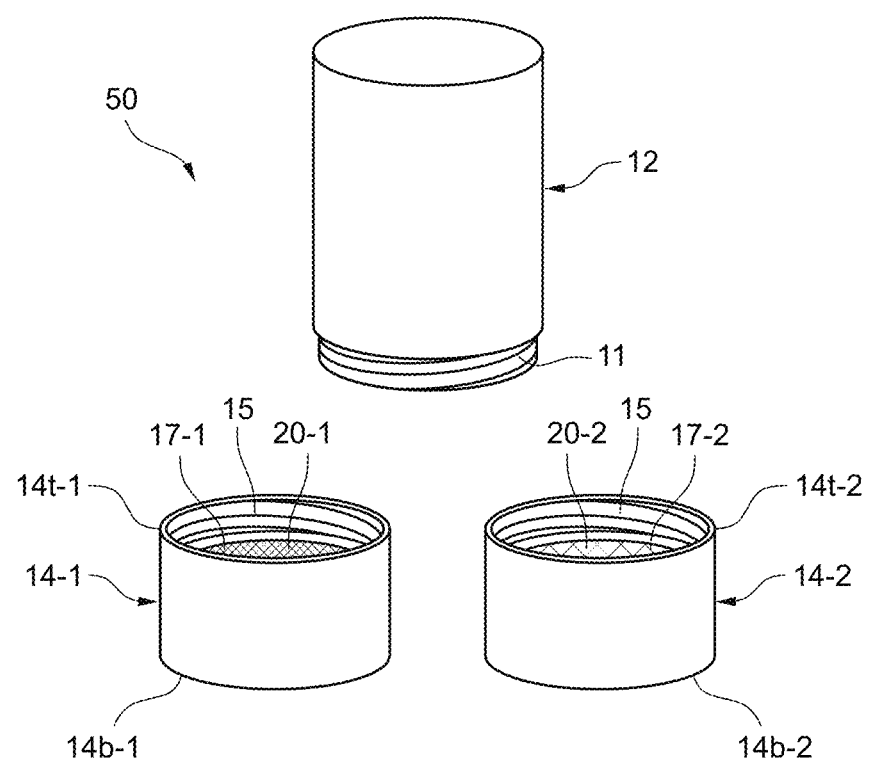
FIG. 21 schematically illustrates in a perspective view a kit according to an embodiment of the second aspect of the invention.

FIG. 21 shows a schematic perspective view of a kit 50 according to an embodiment of the invention. The kit 50 comprises a filtering beaker 10 comprising a main body 12, which is identical to the exemplary main body shown in FIGS. 2 to 5, a first filtering body 14-1 and a second filtering body 14-2. Each of the filtering bodies 14-1 and 14-2 of the kit 50 is similar to the tubular filtering body 14 of the embodiment illustrated in FIGS. 2, 3, 4, 6 and 7 but having no openings 19 formed in a sidewall thereof. Each of the first filtering body 14-1 and the second filtering body are removably and exchangeably attachable to the main body 12 using a corresponding releasable coupling mechanism, which in the embodiment shown is configured as a threaded mechanism comprising a male threaded profile 11 at the bottom end of the main body 12 and a female threaded profile formed at the connecting portion 15 of each of the first filtering body 14-1 and the second filtering body 14-2, as was the case in the embodiments illustrated in FIGS. 2 to 7 and 13 to 16.

The first and second filtering bodies 14-1, 14-2 each comprise a base 17-1 and 17-2, which in this case are arranged at a longitudinal position between the respective top end 14t-1 or 14t-2 and the respective bottom end 14b-1, 14b-2, closer to the respective top end 14t-1, 14t-2 than to the respective bottom end 14b-1, 14b-2. However, as previously pointed out, the longitudinal position of the bases 17-1 and 17-2 can be different in other embodiments. For example, the bases 17-1 and 17-2 can be arranged at the bottom end 14b-1 or 14b-2 of the respective filtering body 14-1, 14-2 in other related embodiments.

Each of the bases 17-1, 17-2 comprises a respective filtering area 20-1, 20-1 formed therein as a filtering mesh. The structural properties of the first and second filtering bodies 14-1 and 14-2 can be substantially identical, the only difference being different filtering sizes of the filtering areas 20-1 and 20-2. For example, the first filtering body 14-1 may have a filtering area 20-1 with a first filtering size smaller than a second filtering area 20-2 of the second filtering body 14-2. In a more specific example, the first filtering body 14-1 may have a filtering area 20-1 with a filtering size of 150 µm while the second filtering body 14-2 may have a filtering area 20-2 with a filtering size of 500 µm. Thus, a user of the filtering kit 50 may attach the first filtering body 14-1 to the main body 12 for producing a liquid emulsion out of water and seeds, such as *soja* beans or tiger nuts, for which a filtering size of 150 µm is more appropriate and may exchange the first filtering body 14-1 by the second filtering body 14-2 by detaching the first filtering body 14-1 from the main body and by attaching instead the second filtering body 14-2 to the main body 12 for producing a liquid emulsion out of water and nuts such as peanuts, hazelnuts or cashew nuts, for which a filtering size of 500 µm is more appropriate.

The exemplary kit 50 illustrated in FIG. 21 comprises two filtering bodies 14-1 and 14-2 for illustrative simplicity. However, a kit according to similar or related embodiments may comprise a larger number of filtering bodies, for example three, four or five, each possibly having a different filtering size.

Figure 22:
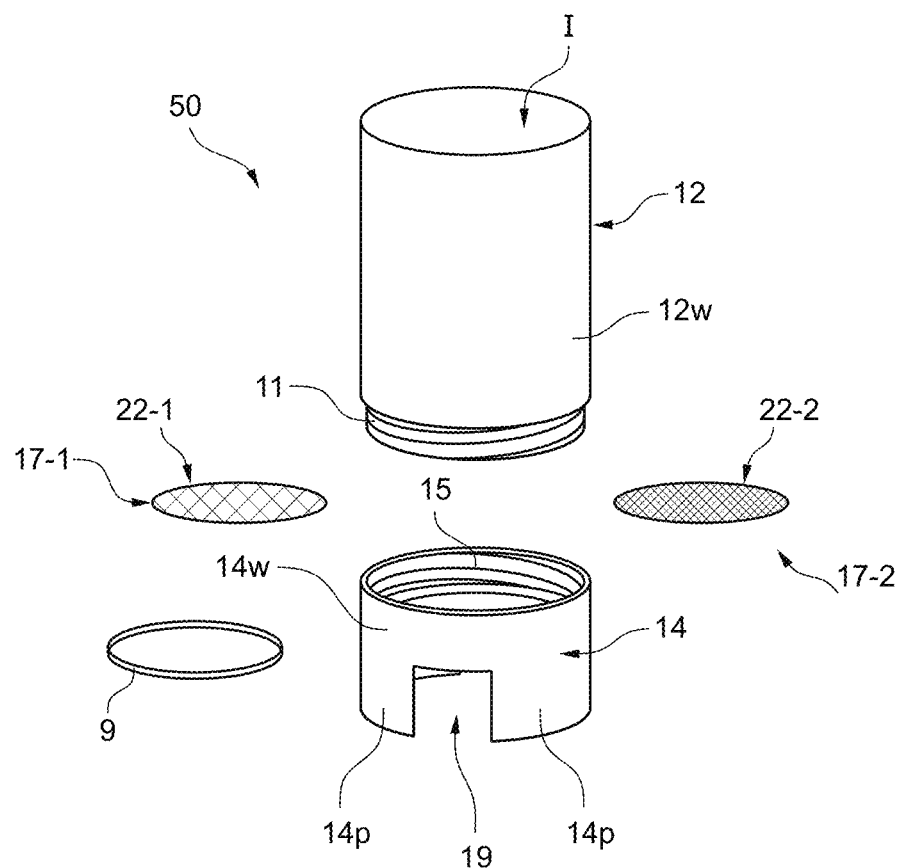
FIG. 22 schematically illustrates in a perspective view a kit according to a further embodiment of the second aspect of the invention.

FIG. 22 shows a schematic perspective view of a kit 50 according to a further embodiment of the invention. The kit 50 comprises a filtering beaker 10 with a main body 12 and a filtering body 14 that are structurally similar to the main body 12 and the filtering body 14 of the embodiment illustrated in FIGS. 2 to 7. In particular, the filtering body 14 of the kit 50 also comprises a plurality of openings 19, wherein each opening separates two adjacent standing portions 14p of the sidewall 14w of the filtering body 14.

However, instead of having a fixed base 17 (cf. FIG. 1), the filtering body 14 of the kit 50 of FIG. 22 comprises a first base configured as a first filtering element 22-1 and a second base configured as a second filtering element 22-2. Each of the first and second filtering elements 22-1 and 22-2 are removably attachable to the rest of the filtering body 14 in order to geometrically close an inner space of the filtering beaker. For that purpose, the first and second filtering elements 22-1 and 22-2 can be configured for being attached to the sidewall 14w of the filtering body 14, for example by resting on a step formed therein as a radial indent extending totally or partly around the inner perimeter of the filtering body 14 and/or by being fastened to the rest of the filtering body 14, for example to the sidewall 14w thereof, by appropriate fastening means such as one or more screws, a clipping mechanism or the like.

The kit 50 of FIG. 22 further comprises a sealing ring 9 arrangeable between the filtering body 14 and the main body 12 and/or between one of the first and second filtering elements 22-1 or 22-2 and the filtering body 14 and/or the main body 12 in order to improve a fluid-tightness of a mechanical connection between the filtering body 14, the main body 12 and/or the respective one of the first and second filtering elements 22-1 or 22-2.

The first filtering element 22-1 has a first filtering size, for example 1 mm, and the second filtering element 22-2 has a second filtering size different from the first filtering size, for example 300 µm. Thus, a user of the filtering kit 50 of FIG. 22 may use the filtering beaker 10 with the filtering body 14 including the first filtering element 22-1 for producing a liquid emulsion out of fruits and/vegetables and optionally milk and/or water, for which a filtering size of 1 mm is more appropriate, and may use the filtering beaker 10 with the filtering body 14 including the second filtering element 22-2 for producing a liquid emulsion out of water and cereals such as rice or oats, for which a filtering size of 300 μm is more appropriate.

The exemplary kit 50 illustrated in FIG. 22 comprises two filtering elements 22-1 and 22-2 for illustrative simplicity. However, a kit according to similar or related embodiments may comprise a larger number of filtering elements, for example three, four or five, each possibly having a different filtering size.

Figure 23:
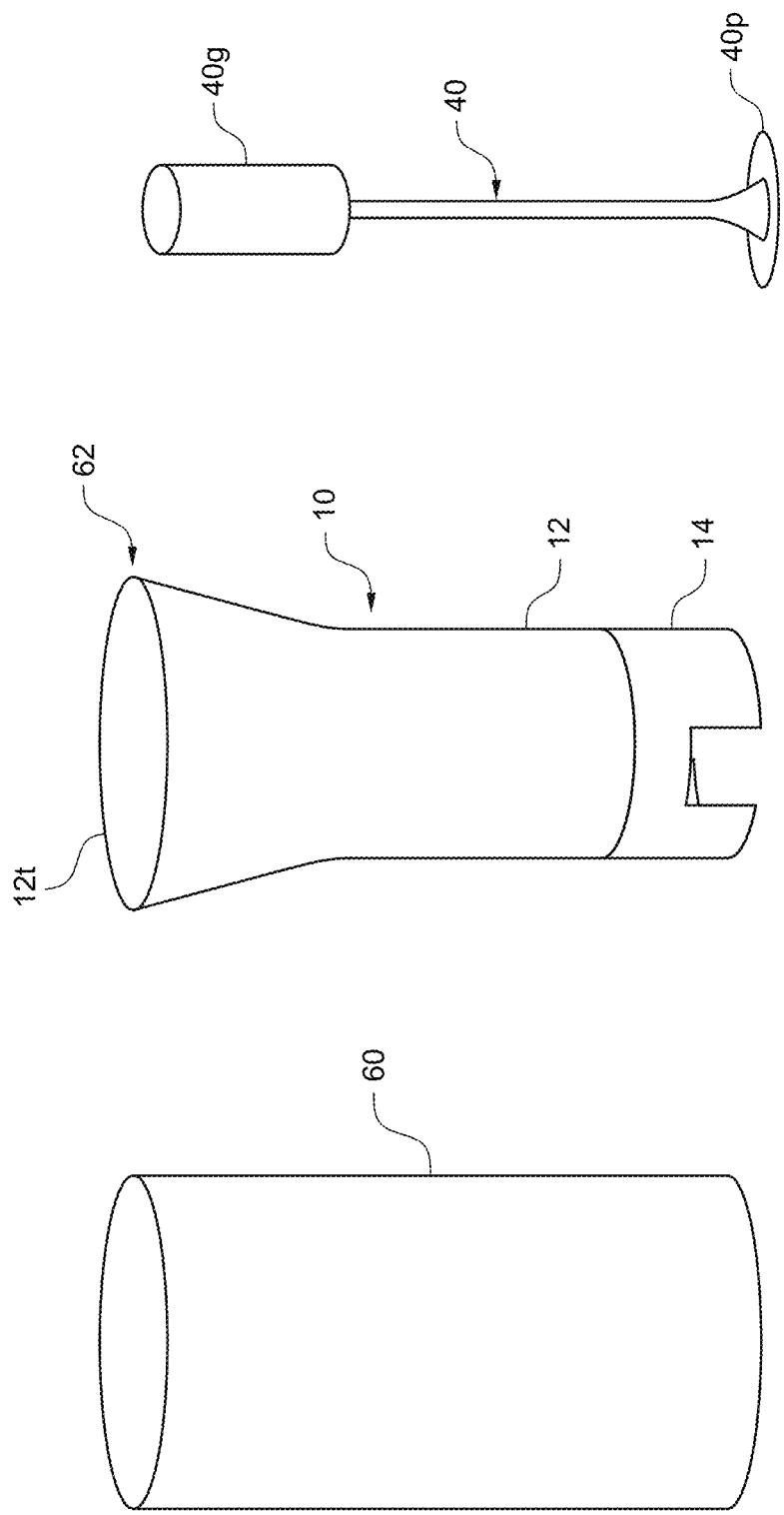
FIGS. 23-25 schematically illustrate the structure and operation of a filtering device according to an embodiment of the third aspect of the invention.

FIG. 23 shows schematic view of a device 100 according to an embodiment of the invention including a filtering beaker 10, a container 60 suitable for receiving therein the filtering beaker 10, and a piston 40 suitable for being inserted into the filtering beaker 10 entirely or partly covering a cross-section thereof. In some embodiments, the filtering beaker 10 can be a filtering beaker 10 of a kit according to embodiments of the present invention, for example a filtering beaker 10 of a kit according to any of the embodiments described with respect to FIG. 21 or 22. In any case, the filtering beaker 10 comprises a main body 12 and a filtering body 14 that is removably attachable to the main body 12, as previously described.

In the exemplary device 100 illustrated in FIG. 23, the main body 12 of the filtering beaker 10 has a widened portion 62 at its top end 12t, at which a cross-section and/or diameter of the main body 12 corresponds to an inner cross-section and/or diameter of the container 60, such that the widened portion 62 can be used as fastening means for fixating a position of the filtering beaker 10 with respect to the container 60 when the filtering beaker 10 is received within the container 60, in particular by form-fitting. Further, the greater inner cross-section the filtering beaker 10 has at the widened portion 62 simplifies the task of introducing ingredients into the filtering beaker 10.

In the exemplary device 100 illustrated in FIG. 23, the container 60 is a substantially cylindrical container, for example made of plastic or glass, having a diameter of 12 cm and a height of 23 cm. Thus, the widened portion 62 of the filtering beaker 10 has, at its widest part, a diameter of 12 cm. Outside of the widened portion 62, the filtering beaker 10, i.e. both the main body 12 and the filtering body 14, can for example have a diameter of 8 cm. Thus, when the filtering beaker 10 is received within the container 60, the filtering beaker 10 can be interiorly fixed to the upper rim of the container by means of the widened portion 62 and a separation distance $d_s$ between the sidewalls 12w and 14w of the main body 12 and the filtering body 14, respectively, and the sidewall 60w of the container may be—other than in the widened portion 62—of 4 cm. However, the container 60 can have other geometries and configurations. For example, a conventional kitchen pot can also be used as a container 60 for the device 100, in which case the separation distance $d_s$ can be much larger, possibly 10 cm, 20 cm or more, and in which case the filtering beaker 10 can have another type of fastening means (other than the widened portion 62) or no fastening means at all.

The piston 40 can be made of wood, metal, plastic or any suitable material and has an elongated shape, such that it can be inserted into the filtering beaker 10. The piston 40 comprises a piston head 40p having a cross-section substantially corresponding to an inner cross-section of the filtering beaker 10 (outside of the widened portion 62). The piston 40 further comprises a grip portion 40g, which can be configured ergonomically for being hand-held by a user.

Figure 24:
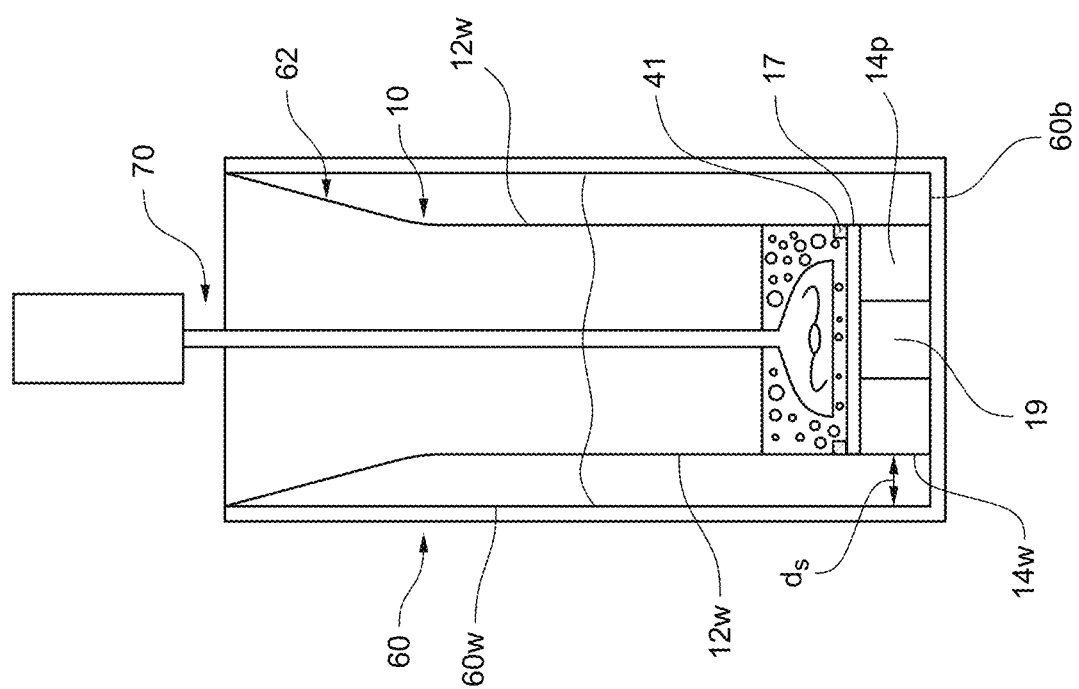

FIG. 24 shows a schematic cross-sectional side view showing the filtering beaker 10 and the container 60 of the device 100 of FIG. 23, wherein the filtering beaker 10 is received within the container 60 and fixated thereto by form-fitting of the widened portion 62 of the filtering beaker 10 against the inner sidewall 60w of the container 60.

As shown in FIG. 24, the filtering beaker 10 is resting on a base 60b of the container 60 by the standing portions 14p of the filtering body 14, which directly contact the base 60b. The openings 19 (only one represented in FIG. 24) create an interspace between the base 60b of the container 60 and the longitudinal (vertical) position of the base 17 within the filtering body 14. The base 17 comprises one or more filtering areas 20 and the sidewall 14w of the filtering body 14 can comprise additional filtering are(s) or no filtering area. Also indicated in FIG. 24 is the separation distance $d_s$ between the inner sidewall 60w of the container 60 and the sidewalls 12w and 14w of the main body 12 and the filtering body 14, respectively. The separation distance $d_s$ can for example be 3 cm.

For preparing a liquid emulsion out of at least one solid ingredient and a liquid ingredient, the at least one solid ingredient, for example nuts, seeds and/or cereals, are introduced into the inner space of the filtering beaker 10. The container is then filled with an appropriate quantity of the liquid ingredient, for example water, and the filtering beaker 10—containing the at least one solid ingredient—is introduced into the container 60 as shown in FIG. 24. Then, a blending device 70, for example a conventional hand-held mixer, is inserted into the filtering beaker 10 such that it is received in the main body 12 and in the filtering body 14.

When the blending device 70 is activated, the rotary motion of the blades of the blending device 70 crush the at least one solid ingredient received within the filtering beaker 10 and generates a turbulent flow that mixes the (crushed) at least one solid ingredient with the surrounding liquid ingredient. The turbulent flow is fostered by the presence of the filtering area(s) 20 of the filtering body 14 and by the presence of the vertical interspace left by the standing portions 14p between the base 60b of the container 60 and the base 17. The flow driven by the blending device 70 is directed downwards from the interior of the filtering beaker 10 through the filtering areas 20 of the base 17 of the filtering beaker 10 into the space enclosed by the standing portions 14p and the base 60b of the container 60 and then deflected radially outwards through the openings 19. Meanwhile, the filtering areas 20 of the filtering body 14 further filtrate the at least one solid ingredient, such that all particles of the at least one solid ingredient having a size greater than the filtering size of the filtering area(s) 20 remain within the filtering beaker 10 and are not dispersed into the surrounding liquid. After an appropriate mixing time, which can for example be between 1 minute and 3 minutes, the blending device 70 can be turned off and removed from the interior of the filtering beaker 10. The liquid emulsion is now contained in the container 60.

When the filtering beaker 10 is removed from the interior of the container 60, remnants of the at least one solid ingredient remain in its interior, typically accumulated on the interior sidewall of the main body 12 and/or the filtering body 14. In order to completely dry out the remnants of the at least one solid ingredient still present in the filtering beaker 10, the piston 40, or any other functionally equivalent element such as pestle, a mortar or the like, can be used for pressing the aforesaid solid remnants against the filtering areas 20 of the filtering body 14, thereby extracting their last liquid extract. The piston can be configured to be a heavy piston having a weight of 2 kg or more, for example 5 kg, such that it can be used for pressing the solid remnants by simply introducing it into the filtering beaker 10 and letting gravity press the piston upon the solid remnants.

Figure 25:
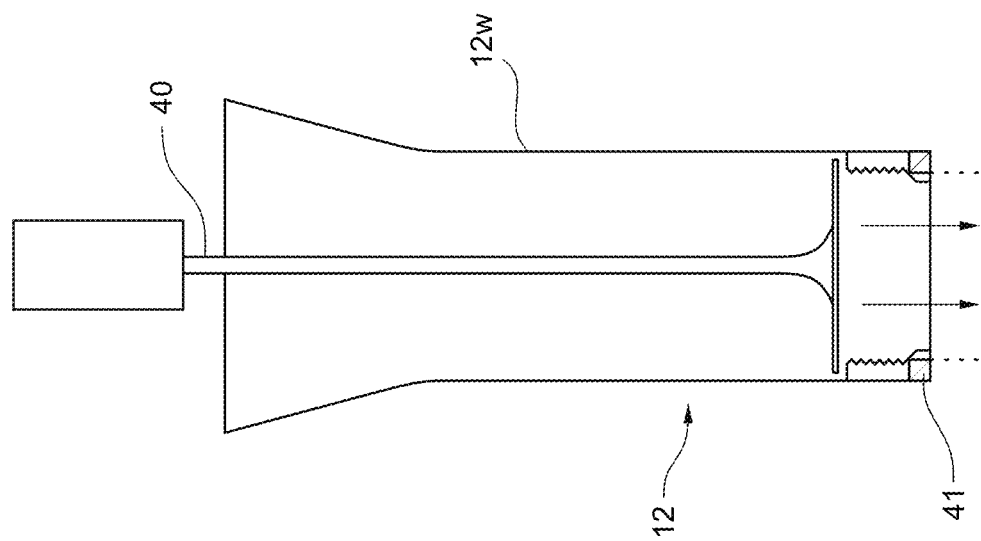

Then, the filtering body 14 may be detached from the main body 12 and the remnants of the at least one solid ingredient that are still in the interior of the main body 12 can be easily disposed of by pushing the remnants out of the main body 12, for example manually, using a spoon or the piston 40 itself, as schematically shown in FIG. 25.

As shown in FIGS. 24 and 25, the sidewall 12*w* of the main body 12 comprises an annular radial protrusion 41 protruding radially inwards from the sidewall 12*w* of the main body 12. The radial protrusion 41 acts as a stopper for the piston 40. When the piston 40 is inserted into the filtering beaker 10—before detaching the filtering body 14 from the main body 12—for pressing the remnants of the at least one solid ingredient still present in the filtering beaker 10 after the action of the blending device 70, the radial protrusion 41 prevents the piston 40 from incidentally damaging the base 17, in particular the filtering areas formed in the base 17.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications should be protected that presently or in the future lie within the scope of protection of the invention as defined in the claims.

Further aspects of the present disclosure, which do not fall under the scope defined in the claims but may nevertheless be part of corresponding further aspects of an invention based on the present disclosure, refer, in a first additional aspect, to a filtering beaker according to any of the embodiments of the first aspect of the invention described above but in which the main body and the filtering body are integrally formed, such that the combination of the main body and filtering body is substantially a one-piece body. This means that, according to this further aspect, the main body and the filtering body may be not removably attachable to each other but instead permanently attached or simply part of one and the same body. Other than that, the filtering beaker according to the second aspect may have any of the features described above for the embodiments of the filtering beaker according to the first aspect of the invention (as long as they are compatible with the main body and the filtering body being the same body). A second additional aspect refers to a kit according to the second aspect of the invention and/or any of the previously described embodiments thereof but including a filtering beaker according to the first additional aspect mentioned above instead of a filtering beaker according to the first aspect of the invention. A third additional aspect refers to a device according to the third aspect of the invention and/or any of the previously described embodiments thereof but including a filtering beaker according to the first additional aspect mentioned above instead of a filtering beaker according to the first aspect of the invention and/or including a kit according to the second additional aspect mentioned above instead of a kit according to the second aspect of the invention. Specific examples of these further aspects of the present disclosure include in particular:

Examples

1. A filtering beaker for producing a liquid emulsion comprising:
    a main body with tubular geometry; and
    a filtering body with a geometry matching the tubular geometry of the main body at least at a connecting portion of the filtering body, wherein the filtering body is permanently attached to the main body by the connecting portion thereof, wherein the filtering body comprises a base covering a cross-section of the filtering beaker, and wherein the filtering beaker comprises at least one filtering area for filtering and emulsifying a liquid emulsion being produced with the filtering beaker.
2. The filtering beaker of example 1, wherein the at least one filtering area is arranged on the base of the filtering body and/or on at least one sidewall of the filtering body.
3. The filtering beaker of example 1 or 2, further comprising at least one additional filtering area arranged on at least one sidewall of the main body, in particular adjacent to the filtering body and/or in a bottom part of the at least one sidewall of the main body.
4. The filtering beaker of any of the preceding examples, further comprising one or more standing portions for supporting the filtering beaker on a substrate when the filtering beaker stands on said substrate, wherein the one or more standing portions extend in a longitudinal direction of the filtering beaker such that, when the filtering beaker stands on said substrate, a gap remains between the substrate and the filtering body and/or between the substrate and the base.
5. The filtering beaker of example 4, wherein the one or more standing portions correspond to portions of at least one sidewall of the filtering beaker, and wherein one or more openings are formed in said at least one sidewall of the filtering beaker between neighbouring standing portions, wherein the one or more openings extend upwards in a longitudinal direction of the filtering beaker from a bottom end of the filtering beaker to a height over the bottom end of the filtering beaker.
6. The filtering beaker of any of the preceding examples, wherein the filtering body has a tubular geometry, wherein the base covering a cross-section of the filtering beaker is or comprises a filtering element comprising one or more of the at least one filtering area, wherein the filtering element is removably attachable to the rest of the filtering body.
7. The filtering beaker of any of the preceding examples, wherein the at least one filtering area comprises at least one filtering mesh covering one or more windows in the filtering body.
8. The filtering beaker of any of the preceding examples, wherein the at least one filtering area comprises a plurality of filtering pores formed in the filtering body.
9. The filtering beaker of any of the preceding examples, wherein the at least one filtering area has a filtering size from 0.1 mm to 3 mm, in particular 0.15 mm, 0.30 mm, 0.50 mm, 1 mm or 3 mm.
10. A kit for producing a liquid emulsion comprising:
    a filtering beaker according to any of the preceding examples,
    wherein the kit comprises a plurality of different bases of the filtering body configured as different filtering elements, each comprising at least one filtering area and being removably attachable to the rest of the filtering body of the filtering beaker.
11. The kit of example 10, wherein the filtering elements of the plurality of filtering elements differ by a filtering size thereof.

12. A device (100) for producing a liquid emulsion comprising:
- a filtering beaker according to any of examples 1 to 9 and/or a filtering kit according to example 10 or 11; and
- a piston configured for being received within the filtering beaker and covering an internal cross section of the filtering beaker at least in part; and/or
- a container for receiving the filtering beaker therein, such that a liquid emulsion being produced with the filtering beaker by the action of a blending device received within the filtering beaker can be collected in the container.

13. The device of example 12 comprising the container, wherein the device further comprises fastening means for fixating a position of the filtering beaker within the container.

14. The device of example 12 or 13 comprising the container, wherein a cross-section of the container is greater than a cross-section of the filtering beaker such that, when the filtering beaker is received within the container, at least one sidewall of the filtering beaker is separated from at least one sidewall of the container by a separation distance, wherein the separation distance preferably is from 1 cm to 15 cm, more preferably from 2 cm to 10 cm.

The invention claimed is:

1. A filtering beaker for producing a liquid emulsion comprising:
- a main body with a tubular geometry configured for receiving therein a blending device for producing the liquid emulsion;
- a filtering body with a geometry matching the tubular geometry of the main body at least at a connecting portion of the filtering body, wherein the filtering body is removably attachable to the main body by the connecting portion thereof, wherein the filtering body is or comprises a base covering a cross-section of the filtering beaker, and wherein the filtering beaker comprises at least one filtering area for filtering and emulsifying a liquid emulsion being produced with the filtering beaker, wherein the at least one filtering area is arranged on the base of the filtering body;
- wherein the filtering beaker further comprises a plurality of standing portions for supporting the filtering beaker on a substrate when the filtering beaker stands on said substrate, wherein the plurality of standing portions are formed between one or more openings and extend in a longitudinal direction of the filtering beaker such that, when the filtering beaker stands on said substrate, a gap remains between the substrate and the filtering body and/or between the substrate and the base, allowing a turbulent flow driven by a blending device received within the filtering beaker to be directed through the at least one filtering area axially downwards within said gap towards the substrate and radially outwards through the one or more openings.

2. The filtering beaker of claim 1, wherein the filtering body is removably attachable to the main body by means of a threaded mechanism or a clipping mechanism.

3. The filtering beaker of claim 1, wherein the main body has a longitudinal extension corresponding to at least 1.5 times a longitudinal extension of the filtering body.

4. The filtering beaker of claim 1, wherein the main body comprises or is made of one or more first materials and the filtering body comprises or is made of one or more second materials different from the one or more first materials.

5. The filtering beaker of claim 1, wherein the one or more standing portions correspond to portions of at least one sidewall of the filtering beaker, and wherein one or more openings are formed in said at least one sidewall of the filtering beaker between neighbouring standing portions, wherein the one or more openings extend upwards in a longitudinal direction of the filtering beaker from a bottom end of the filtering beaker to a height over the bottom end of the filtering beaker.

6. The filtering beaker of claim 1, wherein the filtering body has a tubular geometry, wherein the base covering a cross-section of the filtering beaker comprises or is a filtering element comprising one or more of the at least one filtering area, wherein the filtering element is removably attachable to the rest of the filtering body.

7. The filtering beaker of claim 1, wherein the at least one filtering area comprises at least one filtering mesh covering one or more windows in the filtering body, and wherein the at least one filtering area comprises a plurality of filtering pores formed in the filtering body.

8. The filtering beaker of claim 1, wherein the at least one filtering area has a filtering size from 0.1 mm to 3 mm.

9. The filtering beaker of claim 1, wherein at least one sidewall of the main body comprises one or more additional filtering areas.

10. The filtering beaker of claim 1, wherein the standing portions all have a same extension in a perimetral direction.

11. The filtering beaker of claim 1, wherein the one or more openings all have a same extension in a perimetral direction.

12. The filtering beaker of claim 1, wherein the standing portions one or more openings have a circular, square or polygonal shape.

13. The filtering beaker of claim 1, wherein the at least one sidewall of the filtering beaker has a crenelated structure, wherein each of the one or more openings is formed as a quadrangular recessed portion formed between two non-recessed portions corresponding to the at least one standing portions.

14. A filtering beaker for producing a liquid emulsion comprising:
- a main body with a tubular geometry configured for receiving therein a blending device for producing the liquid emulsion;
- a filtering body with a geometry matching the tubular geometry of the main body at least at a connecting portion of the filtering body, wherein the filtering body is removably attachable to the main body by the connecting portion thereof, wherein the filtering body is or comprises a base covering a cross-section of the filtering beaker, and wherein the filtering beaker comprises at least one filtering area for filtering and emulsifying a liquid emulsion being produced with the filtering beaker, wherein the at least one filtering area is arranged on the base of the filtering body;
- wherein the filtering beaker further comprises one or more standing portions for supporting the filtering beaker on a substrate when the filtering beaker stands on said substrate, wherein the one or more standing portions extend in a longitudinal direction of the filtering beaker such that, when the filtering beaker stands on said substrate, a gap remains between the substrate and the filtering body and/or between the substrate and the base, allowing a turbulent flow driven by a blending device received within the filtering beaker to be directed through the at least one filtering area axially downwards within said gap towards the substrate;

wherein the one or more standing portions correspond to portions of at least one sidewall of the filtering beaker, and wherein one or more openings are formed in said at least one sidewall of the filtering beaker between neighbouring standing portions, wherein the one or more openings extend upwards in a longitudinal direction of the filtering beaker from a bottom end of the filtering beaker to a height over the bottom end of the filtering beaker.

15. The filtering beaker of claim 14, wherein at least one sidewall of the main body comprises one or more additional filtering areas.

16. A filtering beaker for producing a liquid emulsion comprising:

a main body with a tubular geometry configured for receiving therein a blending device for producing the liquid emulsion, the main body extending axially between a top end of the main body and a bottom end of the main body, the top end of the main body and the bottom end of the main body being open ends;

a filtering body with a geometry matching the tubular geometry of the main body at least at a connecting portion of the filtering body, the filtering body extending axially between a top end of the filtering body and a bottom end of the filtering body, the top end of the filtering body and the bottom end of the filtering body being open ends, wherein the filtering body is removably attachable to the main body by the connecting portion thereof, the filtering body being arrangeable next to and below the main body, wherein the filtering body is or comprises a base covering a cross-section of the filtering beaker, and wherein the filtering beaker, comprises at least one filtering area for filtering and emulsifying a liquid emulsion being produced with the filtering beaker, wherein the at least one filtering area is arranged on the base of the filtering body;

wherein the main body has a longitudinal extension corresponding to at least 1.5 times a longitudinal extension of the filtering body;

wherein the filtering beaker further comprises one or more standing portions for supporting the filtering beaker on a substrate when the filtering beaker stands on said substrate, wherein the one or more standing portions extend in a longitudinal direction of the filtering beaker such that, when the filtering beaker stands on said substrate, a gap remains between the substrate and the filtering body and/or between the substrate and the base, allowing a turbulent flow driven by a blending device received within the filtering beaker to be directed through the at least one filtering area axially downwards within said gap towards the substrate.

17. The filtering beaker of claim 16, wherein a bottom part of said at least one sidewall of the main body and/or a part thereof adjacent to the filtering body and/or to the base, comprises said one or more additional filtering areas.

18. The filtering beaker of claim 16, wherein at least one sidewall of the main body comprises one or more additional filtering areas.

19. The filtering beaker of claim 16, wherein a bottom part of said at least one sidewall of the main body and/or a part thereof adjacent to the filtering body and/or to the base, comprises said one or more additional filtering areas.

20. The filtering beaker of claim 16, wherein the main body is configured for receiving therein an upper part of said blending device while the filtering body is configured for receiving therein a lower part of said blending device for producing the liquid emulsion.

* * * * *